US011436504B1

(12) United States Patent
Lukarski et al.

(10) Patent No.: US 11,436,504 B1
(45) Date of Patent: Sep. 6, 2022

(54) UNIFIED SCENE GRAPHS

(71) Applicant: Apple Inc., Cupertino, CA (US)

(72) Inventors: Dimitar Hristov Lukarski, Sunnyvale, CA (US); Luke Burke Johnson, Sunnyvale, CA (US); Arun Rao, San Ramon, CA (US); Siddharth Swaminathan, Suunyvale, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 16/432,796

(22) Filed: Jun. 5, 2019

Related U.S. Application Data

(60) Provisional application No. 62/683,212, filed on Jun. 11, 2018.

(51) Int. Cl.
    *G06N 5/04*     (2006.01)
    *G05D 1/00*     (2006.01)
    *G05D 1/02*     (2020.01)

(52) U.S. Cl.
    CPC .............. *G06N 5/04* (2013.01); *G05D 1/0088* (2013.01); *G05D 1/0246* (2013.01); *G05D 1/0255* (2013.01); *G05D 1/0257* (2013.01); *G05D 2201/0213* (2013.01)

(58) Field of Classification Search
    CPC ...... G06N 5/04; G05D 1/0257; G05D 1/0246; G05D 1/0255; G05D 1/0088; G05D 2201/0213
    USPC .......................................................... 701/25
    See application file for complete search history.

(56) References Cited

U.S. PATENT DOCUMENTS

| | | | | |
|---|---|---|---|---|
| 10,309,792 | B2* | 6/2019 | Iagnemma | ......... G01C 21/3461 |
| 2007/0106470 | A1* | 5/2007 | Nakayama | ......... G01C 21/3658 |
| | | | | 701/437 |
| 2011/0066312 | A1* | 3/2011 | Sung | ..................... G05D 1/0274 |
| | | | | 701/25 |
| 2013/0184926 | A1* | 7/2013 | Spero | ..................... B60W 10/18 |
| | | | | 701/25 |
| 2013/0190964 | A1* | 7/2013 | Uehara | .............. G01C 21/3691 |
| | | | | 701/25 |

(Continued)

OTHER PUBLICATIONS

Kihyuk Sohn, et al., "Learning Structured Output Representation using Deep Conditional Generative Models", Advances in Neural Information Processing Systems, 2015, pp. 3483-3491.

(Continued)

*Primary Examiner* — Jonathan M Dager
*Assistant Examiner* — Jean W Charleston
(74) *Attorney, Agent, or Firm* — Robert C. Kowert; Kowert, Hood, Munyon, Rankin & Goetzel, P.C.

(57) ABSTRACT

Indications of static objects (e.g., lane segments, signs etc.) and dynamic objects (e.g., moving vehicles, pedestrians and the like) in the operation environment of a vehicle are obtained. A graph comprising a plurality of nodes and edges is generated. Individual ones of the nodes represent respective static and dynamic objects, and an edge between a first pair of nodes represents a relationship between the objects represented by the pair. The graph includes an indication of an uncertainty metric associated with the relationship. To generate the graph, a geometric analysis is performed, as a result of which an edge between a different pair of nodes is excluded from the graph. Using the graph, one or more operations of a task pertaining to vehicle movements is performed.

20 Claims, 11 Drawing Sheets

(56) References Cited

U.S. PATENT DOCUMENTS

| | | | | |
|---|---|---|---|---|
| 2014/0032017 | A1* | 1/2014 | Anderson | G08G 1/166 |
| | | | | 700/275 |
| 2014/0207325 | A1* | 7/2014 | Mudalige | B62D 15/0255 |
| | | | | 701/25 |
| 2018/0075751 | A1* | 3/2018 | Bostick | G05D 1/0287 |
| 2018/0089563 | A1* | 3/2018 | Redding | G06N 3/08 |
| 2018/0356819 | A1* | 12/2018 | Mahabadi | G05D 1/0217 |

OTHER PUBLICATIONS

Caglar Gulcehre, et al, "Learned-Norm Pooling for Deep Feedforward and Recurrent Neural Networks", Gulcehre, Caglar, et al. "Learned-norm pooling for deep feedforward and recurrent neural networks." Joint European Conference an Machine Learning and Knowledge Discovery in Databases, 2014, pp. 530-546.

David Duvenaud, et al., "Convolutional Networks on Graphs for Learning Molecular Fingerprints", Advances in neural information processing systems, 2015, pp. 2224-2232.

Yujia Li, et al., "Gated Graph Sequence Neural Networks", arXiv preprint arXiv:1511.05493, 2016, pp. 1-20.

Peter Ondruska, et al., "End-to-End Tracking and Semantic Segmentation Using Recurrent Neural Networks", arXiv preprint arXiv:1604.05091, 2016, pp. 1-9.

Yichuan Tang, et al., "Learning Stochastic Feedforward Neural Networks", In Advances in Neural Information Processing Systems, 2013, pp. 530-538.

Shaosheng Cao, et al., "Deep Neural Networks for Learning Graph Representations", Proceedings of the Thirtieth AAA Conference on Artificial Intelligence (AAAI-16), 2016, pp. 1-8.

Max Jaderberg, et al, "Reinforcement Learning with Unsupervised Auxiliary Tasks", arXiv:1611.05397v1 [cs.LG], Nov. 16, 2016, pp. 1-14.

Isaac Dykeman, "Conditional Variational Autoencoders", Retrieved from URL: http://ijdykeman.github.io/ml/2016/12/21/cvae.html on Mar. 16, 2017, pp. 1-12.

Diederik P. Kingma, et al., "Auto-Encoding Variational Bayes", arXiv:1312.6114v10 [stat.ML], May 1, 2014, pp. 1-14.

Heiga Zen, et al., "Deep Mixture Density Networks for Acoustic Modeling in Statistical Parametric Speech Synthesis", Acoustics, Speech and Signal Processing (ICASSP), 2014 IEEE International Conference on. IEEE, pp. 3844-3848.

Werner Uwents, et al., "A Comparison between Neural Network Methods for Learning Aggregate Functions", International Conference on Discovery Science, 2008, pp. 88-99.

Alberto Testolin et al., "Probabilistic Models and Generative Neural Networks: Towards an Unified Framework for Modeling Normal and Impaired Neurocognitive Functions", Frontiers in Computational Neuroscience, Published Jul. 13, 2016, pp. 1-9.

Dietmar Kasper, et al., "Object-Oriented Bayesian Networks for Detection of Lane Change Maneuvers", Intelligent Transportation Systems Magazine, Jan. 12, vol. 4, No. 1, pp. 1-10.

Wikipedia, "Mixture distribution", Retrieved from URL: https://en.wikipedia.org/wiki/Mixture_distribution on Mar. 16, 2017, pp. 1-8.

Wikipedia, "Multi-task learning", Retrieved from URL: https://en.wikipedia.org/wiki/Multitask_learning on Mar. 20, 2017, pp. 1-11.

Christopher M. Bishop, "Mixture Density Networks", Neural Computing Research Group, Dept of Computer Science and Applied Mathematics, Feb. 1994, pp. 1-26.

Julie Dequaire, et al, "Deep Tracking on the Move: Learning to Track the World from a Moving Vehicle using Recurrent Neural Networks", arXiv:1609 09365v2 [cs.CV], Feb. 9, 2017, pp. 1-8.

Eike Rehder, et al., "Goal-Directed Pedestrian Prediction", Proceedings of the IEEE International Conference on Computer Vision Workshops, 2015, pp. 1-9.

Carl Doersch, "Tutorial on Variational Autoencoders", arXiv:1606.05908v2 [stat.ML], Aug. 13, 2016, pp. 1-23.

David Silver, et al., "Mastering the Game of Go with Deep Neural Networks and Tree Search," Published in "Nature" Jan. 28, 2016, pp. 1-37.

Sebastian Brechtel, et al., "Dynamic Decision-making in Continuous Partially Observable Domains: A Novel Method and its Application for Autonomous Driving," This document is licensed under the Creative Commons Attribution 3.0 DE License, Jul. 6, 2015, pp. 1-225.

Wikipedia, "Monte Carlo tree search," https://en.wikipedia.org/wiki/Monte_Carlo_tree_search, Jul. 14, 2016, pp. 1-9.

Guillaume Chaslot, et al., "Monte-Carlo Tree Search: A New Framework for Game AI," Copyright c 2008, Association for the Advancement of Artificial Intelligence (www.aaai.org), pp. 216-217.

Douglas C. Whitaker, "A Brief Description of Monte Carlo Tree Search," Dec. 9, 2011, pp. 1-4.

U.S. Appl. No. 15/988,929, filed May 24, 2018, Juergen Wiest et al.

\* cited by examiner

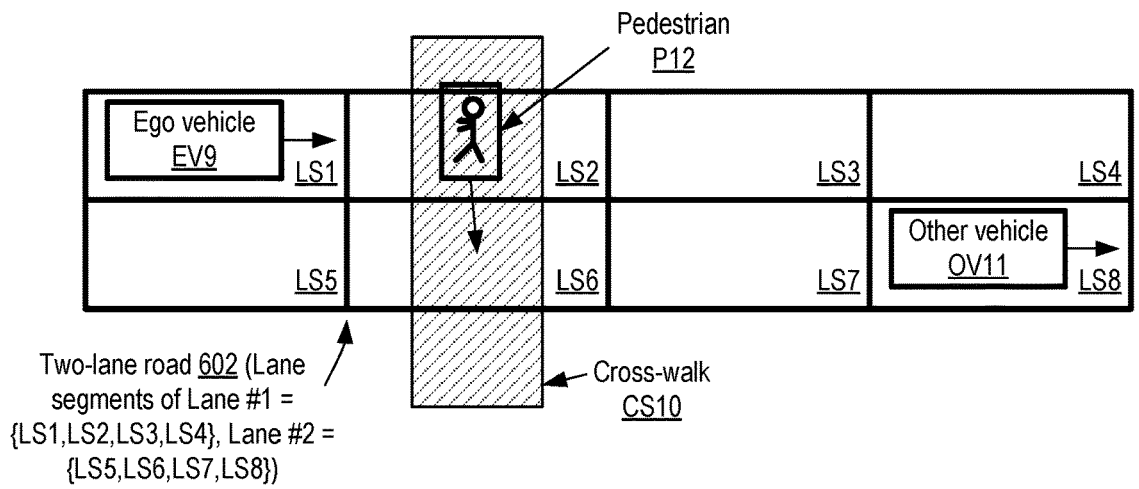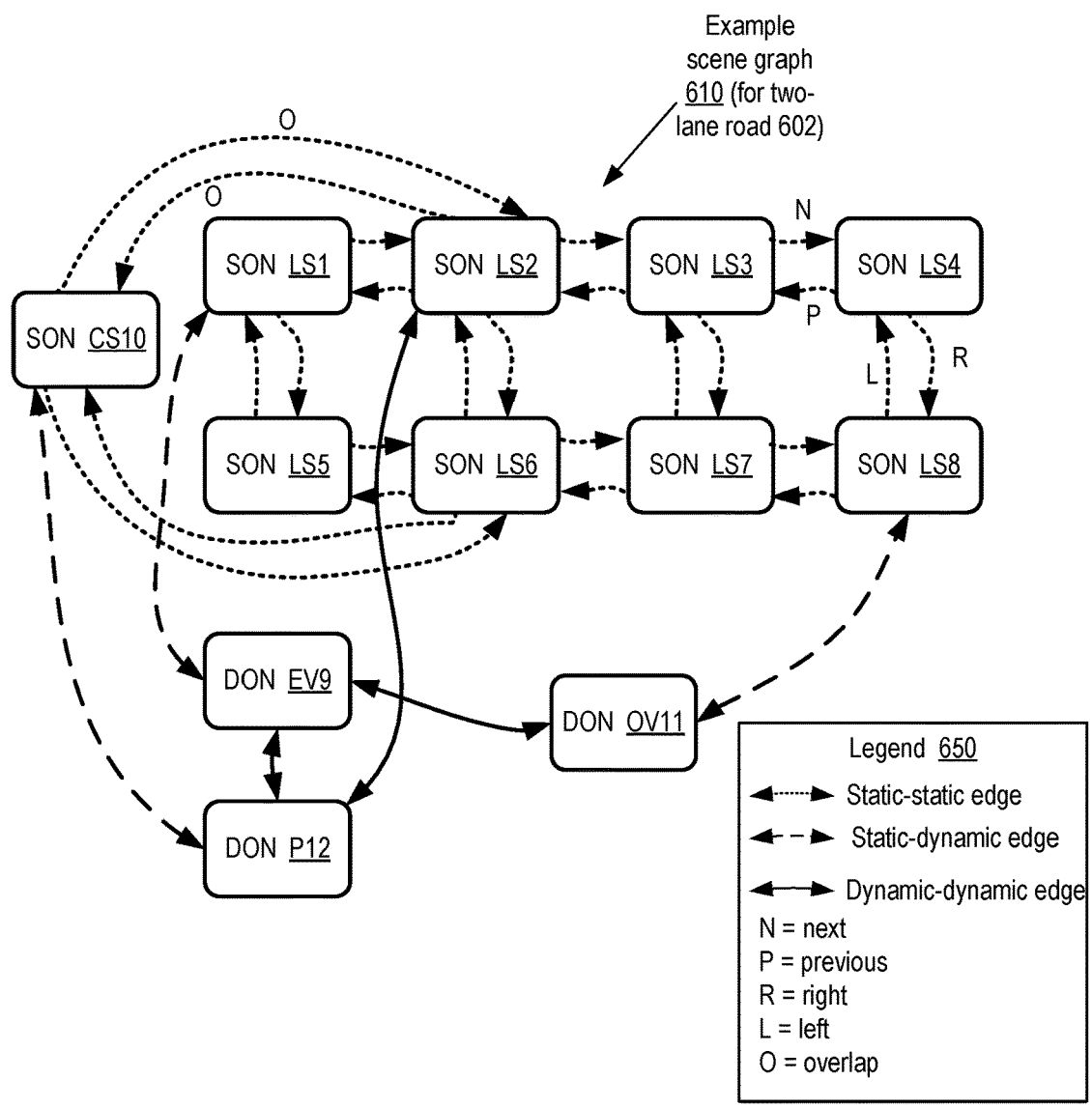
FIG. 6

Lane segment 702

- Left/right boundary geometry (with uncertainties) 702-1
- Topological connections (L,R,N,P,O) 702-2
- Controlled by traffic light? 702-3
- Speed limit 702-4
- Permitted traffic direction(s) 702-5
- In parking lot? 702-6
- Traversal restrictions 702-7

Dynamic object 704

- Object type (e.g., car, truck, pedestrian, etc.) (with uncertainty) 704-1
- Speed (with uncertainty) 704-2
- Acceleration (with uncertainty) 704-3
- Direction (with uncertainty) 704-4
- LIDAR/Radar data (with uncertainty) 704-5
- Camera-based distance from ego (with uncertainty) 704-6
- Bounding box 704-7 (with uncertainty)
- Center of mass location 704-8 (with uncertainty)
- Simplified trajectory history 704-9 (with uncertainty)

Static-static edge 706

- Relative position (L,R,N,P,O) 706-1
- Geometry info 706-2 (e.g., distance, with uncertainty)
- Traversal restrictions 706-3 (e.g., yield requirements,...)

Static-dynamic edge (or dynamic-static edge) 708

- Estimated distance, with uncertainty 708-1
- Source(s) of distance 708-2 (e.g., camera, radar, LIDAR, deduced/indirect)
- Expected interaction type 708-3 (e.g., "none", "on", "near")

Dynamic-dynamic edge 710

- Estimated distance, with uncertainty 710-1
- Source(s) of distance 710-2 (e.g., camera, radar, LIDAR, deduced/indirect)
- Expected interaction type 710-3
- Rules based minimum distance 710-4

*FIG. 7*

UNIFIED SCENE GRAPHS

This application claims benefit of priority to U.S. Provisional Application No. 62/683,212 filed Jun. 11, 2018, which is hereby incorporated by reference in its entirety.

BACKGROUND

Technical Field

This disclosure relates generally to systems for representing and processing information about a vehicle's environment for reasoning and decision making with respect to controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Until relatively recently, due to the limitations of the available hardware and software, the maximum speed at which computations for analyzing relevant aspects of the vehicle's external environment could be performed was insufficient to enable non-trivial navigation decisions to be made without human guidance. Even with today's fast processors, large memories, and advanced algorithms, however, the task of making timely and reasonable decisions (which are based neither on excessively pessimistic assumptions, nor on excessively optimistic assumptions) regarding an autonomous vehicle's trajectory in the context of uncertain information regarding static entities (e.g., lane segments, traffic signs etc.) and numerous dynamic entities (such as other vehicles, pedestrians, and the like) with potentially unpredictable behaviors remains a non-trivial challenge.

SUMMARY OF EMBODIMENTS

According to one embodiment, a method may comprise performing, at one or more computing devices, obtaining respective indications of one or more static objects in an operation environment of a vehicle, as well as one or more dynamic objects in the environment. The method may also include generating a graph comprising a plurality of nodes and a plurality of edges to represent various objects in the environment and their relationships. One node of the graph may, for example, represent the first vehicle, other nodes may represent the one or more static objects, and still other nodes may represents the one or more dynamic objects. An edge between a given pair of nodes of the graph may represent a relationship between a pair of objects represented by the pair. In at least some embodiments, the graph may include one or more types of uncertainty metrics—e.g., uncertainty metrics associated with relationships represented by respective edges, and/or uncertainty metrics regarding potentially incorrect identification of objects corresponding to respective nodes. In some embodiments, generating the graph may comprise determining, e.g., based on a geometric analysis, that an edge between a particular pair of nodes is not to be included in the graph—that is, not all pairs of nodes present in the graph may necessarily be linked by edges. The method may also include providing the graph as input to a reasoning component of a vehicle intelligence or decision making subsystem, and preparing a trajectory for the vehicle using the reasoning engine. The method may further include transmitting, to a motion control subsystem of the vehicle, a directive to move the vehicle according to the trajectory.

According to another embodiment, a system may comprise one or more processors and a memory. The memory may store program instructions that when executed on or across the one or more processors cause the one or more processors to obtain respective indications of one or more static objects in an operation environment of a vehicle, as well as one or more dynamic objects in the environment. The instructions when executed may cause the one or more processors to generate a graph comprising a plurality of nodes and a plurality of edges. One node of the graph may, for example, represent the first vehicle; other nodes may represent respective static objects, and still other nodes may represent respective dynamic objects. An edge between a given pair of nodes of the graph may represent a relationship between a pair of objects represented by the pair. In at least some embodiments, the graph may include uncertainty metrics associated with the relationships corresponding to one or more edges. In some embodiments, generating the graph may comprise determining, e.g., based on a geometric analysis, that an edge between a particular pair of nodes is not to be included in the graph. The instructions when executed may also cause one or more operations of a task pertaining to vehicle movements to be performed using the graph.

In one embodiment, one or more non-transitory computer-accessible storage media may store program instructions that when executed on or across one or more processors cause the one or more processors to obtain respective indications of one or more static objects in an operation environment of a vehicle, as well as one or more dynamic objects in the environment. The instructions when executed may cause the one or more processors to generate a graph comprising a plurality of nodes and a plurality of edges. One node of the graph may, for example, represent the first vehicle; other nodes may represent respective static objects, and still other nodes may represent respective dynamic objects. An edge between a given pair of nodes of the graph may represent a relationship identified between a pair of objects represented by the pair. In at least some embodiments, the graph may include an indication of an uncertainty metric associated with the relationship. In some embodiments, generating the graph may comprise determining, e.g., based on a geometric analysis, that an edge between a particular pair of nodes is not to be included in the graph. The instructions when executed may also cause the one or more processors to cause one or more directives to implement a trajectory (which was prepared using the graph) of the vehicle to be transmitted to a motion control subsystem of the vehicle.

BRIEF DESCRIPTION OF DRAWINGS

FIG. 6 illustrates a simple example of a unified scene graph, according to at least some embodiments.

FIG. 7 illustrates example attributes of nodes and edges of a unified scene graph, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
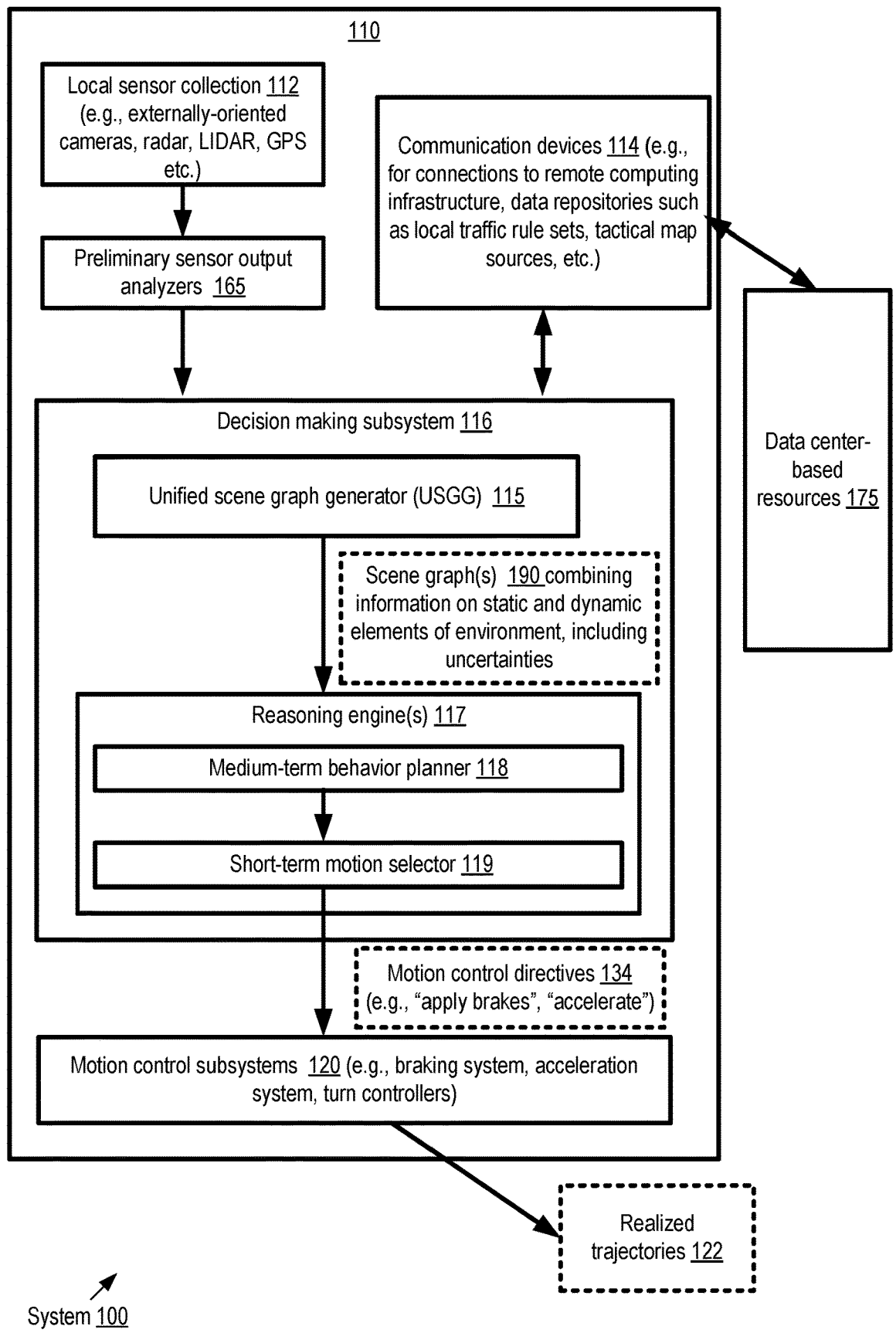
FIG. 1 illustrates an example system environment in which sparse unified scene graphs, which combine information representing both static and dynamic objects in a vehicle's environment in an efficient format, may be generated and used for reasoning about the future movements of the vehicle, according to at least some embodiments.

FIG. 1 illustrates an example system environment in which sparse unified scene graphs, which combine information representing both static and dynamic objects in a vehicle's environment in an efficient format, may be generated and used for reasoning about the future movements of the vehicle, according to at least some embodiments. As shown, system 100 comprises an autonomous or partially-autonomous vehicle 110. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's reasoning or decision making components, or even disable such components at least temporarily; furthermore, in at least one embodiment, a decision-making component of the vehicle may request or require an occupant to participate in making some decisions under certain conditions. To help introduce the algorithms and data structures which may be used for planning and controlling the vehicle's movements, four types of components of the vehicle 110 are introduced at a high level in FIG. 1: vehicle intelligence and motion-related decision making subsystem 116, local sensor collection 112 (with associated preliminary output analyzers 165), motion control subsystems 120 and communication devices 114. Individual ones of these components may comprise portions or all of one or more computing devices in various embodiments.

The intelligence and decision making components 116 may comprise multiple tiers or layers in the depicted embodiment, including but not necessarily limited to a unified scene graph generator (USGG) 115, a medium-term behavior planner 118, and a short-term motion selector 119. The medium-term behavior planner 118 and the short-term motion selector 119, at one or both of which reasoning algorithms may be implemented, may collectively be referred to as reasoning engines 117, or as subcomponents of a single reasoning engine 117 in some embodiments. A wide variety of reasoning algorithms and/or models, including for example various types of statistical and machine learning models may be employed at the reasoning engines 117 in different embodiments. In at least some embodiments, the USGG 115 may be implemented as an independent component external to the vehicle intelligence and motion decision making subsystem 116, instead of being considered part of the vehicle intelligence and motion decision making subsystem.

At a high level, at least a subset of the workflow for planning and implementing the movements of the vehicle 110 may comprise the following stages (which may be performed iteratively) in at least some embodiments. The sensor collection 112 and/or the communication devices 114 may be used to obtain data about the vehicle's environment in such embodiments. At various points in time, at least a subset of the currently-available data may be used to create a respective unified scene graph 190 by the USGG 115 in various embodiments, representing static and dynamic objects identified in the environment with respective levels of uncertainty, as well as relationships identified or deduced among various pairs of objects in the environment (which may have their own levels of uncertainty). The static and dynamic objects may be represented by respective nodes, and the edges may represent the relationships (e.g., distances, observability between two objects, etc.). Note that at least in some embodiments, one or more of the nodes in the graph may not necessarily represent physical objects detected in the environment; instead, some nodes may represent virtual constructs or entities introduced to help with reasoning or analysis about the environment. In some embodiments, for example, an origin of a coordinate frame (which does not exist as a physical object) which can potentially be used to reason about positions of various other objects, or to submit (and respond to) queries regarding other objects, may be represented as a node in a graph 190. As discussed below in further detail, nodes representing lane segments, at least some of whose boundaries may be virtual/artificial rather than physical, may be included in graphs 190 in various embodiments. Similarly, some graph nodes may be used to represent portions of parking lots, even though physical boundaries separating the portions may not exist, or may not be clearly defined, in the real world. In some embodiments, at least some of the nodes (such as lane segment nodes) of a graph may comprise discretized and/or simplified representations of portions of large real-world objects, e.g., in scenarios in which it may be useful to logically subdivide the real-world objects for reasoning and planning purposes.

In various embodiments, temporal information may be stored with nodes and/or edges, indicating for example the times (or time ranges) at which the corresponding objects/relationships were detected or recognized. At least in some embodiments, in which information to be incorporated in a graph 190 may be obtained asynchronously from various sources such as sensors operating at a variety of data collection speeds, the different nodes and/or edges may not all represent the same point in time—e.g., the information represented in one node N1 may have been obtained at time T1, while the information represented in another node N2 may have been obtained at time (T1+delta). As such, perfect temporal consistency or synchronization among the nodes and/or edges may not be required in such embodiments—instead, respective temporal data (e.g., a time range during which the information represented by the node or edge was collected, or a time range for which the information is applicable or valid) about at least a subset of the nodes and/or edges may simply be tracked. In at least some embodiments, multiple nodes representing the same object at different points in time may be included in the same graph; such nodes may be used, for example, to detect and/or reason about trajectories over time. Similarly, in some embodiments, multiple edges may be used to represent the same relationship at different points in time. In one embodiment, an edge μ1 between a first node N1 representing an object O1 at a time T1, and a second node N2 representing the same object O1 at a later time T2 may in effect represent a process model for O1, modeling the dynamics of O1 between T1 and T2.

Uncertainty metrics may be determined for various nodes, edges etc. based on any combination of various factors in different embodiments—e.g., based on one or more of (a) error bounds explicitly or implicitly indicated by a sensor device used to determine an object or a relationship between two objects, (b) (for example in scenarios in which the sensor does not provide error bounds) an estimate of an accuracy of a type of a sensor device whose output is used to determine the object or relationship, or (c) an estimate of a distance between a pair of objects (e.g., if an object appears to be far away from another, the uncertainty associated with the relationship between the objects may be higher). The graphs 190 may be provided as input to the reasoning engines 117, and/or or used to respond to queries from the reasoning engines 117, in various embodiments. As described below, in at least some embodiments various kinds of information may be represented or encoded in the graphs 190 in such a manner that the computational effort required to implement the reasoning algorithms may be reduced substantially, relative to at least some conventional approaches towards representing vehicle environments. For example, a number of geometry-related computations may be performed as part of the procedure for creating the graphs 190 and the results of such computations may be incorporated in the graphs; consequently, less geometry-related computation may have to be performed at the reasoning components. The reasoning algorithms utilizing the information encoded in the graph may be used to plan trajectories for the vehicle at the reasoning engines 117, and motion control directives 134 may be transmitted to control subsystems 120 to achieve or realize the trajectories 122 in the depicted embodiment.

Graphs 190 may be described as "unified" in various embodiments because, in contrast to some conventional approaches, a given graph may be used to represent both dynamic (moving) and static (unmoving) objects of various categories using a common framework and a common data structure, within which geometric relationships (as well as various other types of relationships) among objects of the different categories identified in the environment is included. Such a unified representation may substantially simplify the computations and queries that have to be performed at the reasoning engines 117, relative for example to scenarios in which static object information is stored using a different framework or data structure than dynamic object information, or relative to scenarios in which different frameworks are used for storing/representing data pertaining to individual types of objects or individual types of sensor data. Although in some environments, the total number of objects (and therefore the possible number of relationships among pairs of objects) in the environment of the vehicle 110 may be very high, in various embodiments geometric estimation or analysis may be performed during the generation of the graph itself, reducing the number of edges substantially from the maximum possible number of edges, resulting in at least some cases in a "sparse" unified scene graph. In embodiments in which different graph nodes may be used to represent the same object at different points in time, or respective edges may be used to represent the same relationship at different points in time, the total possible number of edges may be even higher. In some embodiments, for example, bounding volume hierarchy (BVH) or similar algorithms may be used to identify the object pairs for which edges should be included or excluded—e.g., if such an algorithm indicates that the distance between two objects is very likely to be above a threshold, an edge connecting the nodes representing the objects may not be required in the graph. In one embodiment, when determining whether an edge should be included for a given pair of nodes, the current proximity of the objects represented by the nodes may be estimated or determined (e.g., using joint estimates from a variety of potentially independent data sources such as different types of sensors), and/or the predicted future proximity of the pair of objects within some selected time window may be estimated or determined. In some embodiments, several versions of graphs may be produced internally at the USGG 115, e.g., using reconciliation algorithms to remove redundant nodes that are estimated to represent the same object, computing joint estimations of some quantities such as distance, velocity and the like with respect to some pairs of objects using respective paths within one version of the graph, and so on, before a final output graph is generated for the reasoning engines 117. The extent of processing/estimation performed at the USGG itself (as opposed to at the downstream reasoning components) may vary based on the type of node or edge in some embodiments; additional processing on the graph 190 may of course be performed at the reasoning engines 117 as needed in various embodiments.

As one skilled in the art will appreciate in light of this disclosure, certain embodiments may be capable of achieving various advantages, including some or all of the following: (a) reducing the amount of computation, memory, storage and/or networking-related resources that are required to plan and implement trajectories for various types of autonomous vehicles, e.g., by enabling the reasoning engine algorithms to avoid having to repeatedly access different types of data sources/structures and perform geometric computations dynamically for reasoning about static and dynamic objects, (b) by incorporating uncertainty metrics from various sources and sensor types within a common framework, reducing the probability of unsafe operations of autonomous vehicles, and/or (c) simplifying the task of debugging/analyzing the decisions made at reasoning components of autonomous vehicles.

A wide variety of dynamic and static objects and their interrelationships may be represented in a given graph 190 in different embodiments. For example, static objects may include, among others, lane segments, traffic lights, crosswalks, signs, curbs/medians, traffic gates (e.g., a gate preventing movement across a train track), vegetation such as trees and the like. Dynamic objects may, for example, include the vehicle 110 itself (which may be referred to as the "ego" vehicle or the "target" vehicle for decision making in some embodiments), other autonomous or non-autonomous vehicles, pedestrians, animals (e.g., deer or dogs) moving in the vicinity of the vehicle, moving elements of debris, and the like. A given lane segment, may, for example comprise a section of a traffic lane of some selected length; lane segment boundaries (e.g., boundaries perpendicular to the direction of traffic) may be virtual, in effect superimposed on the real world, rather than physical in various embodiments. For various instances of each type of object identified, at least with some degree of certainty, at a given point in time, values of one or more attributes may be included in a graph 190 in at least some embodiments. Similarly, values of one or more attributes of the relationships represented by edges included in the graph may also may be stored in the graph data structure in different embodiments. Examples of various attributes for objects (graph nodes) and relationships (edges) are provided and discussed in further detail below. In at least some embodiments, the combination of attributes indicated in a graph 190 may enable vehicle trajectories to be planned/prepared using geometric relationship information directly obtained from the graph, without for example performing a geometric computation that accesses a first data structure representing the static objects and a second data structure representing dynamic objects. In addition to planning the trajectories of the ego or target vehicle, the graph 190 may also be used for predicting movements of other dynamic objects (which may, at least in some cases, be helpful in planning the trajectories of the ego vehicle).

In at least some embodiments, prior to the start of a particular journey of vehicle 110, and/or at various stages of a long journey, a representation of a tactical or static map may be obtained or loaded onto the vehicle 110, e.g., from an external location via the communication devices 114 using one or more communication protocols. Such a map may be utilized during the creation of a graph 190, for example, to obtain an indication of an expected location of a static object such as a traffic light or an overpass (which may be used to confirm the object's identification performed based on local sensor data analysis). In some embodiments and for some environments, fine-grained maps may be accessed, which may for example provide static object location and boundary information at the granularity of a few inches or centimeters, and such fine-grained maps may help reduce the uncertainties associated with the information derived from the local sensor collection 112.

The motion control subsystems 120, such as the braking system, acceleration system, turn controllers and the like may collectively be responsible for causing various types of movement changes to modify the trajectory (or maintain the current trajectory) of vehicle 110, e.g., in response to directives or commands issued by the motion selector 119 and/or the behavior planner 118 resulting in the actual or realized trajectory 122. In the tiered approach towards reasoning and decision making illustrated in FIG. 1, the motion selector 119 may be responsible for issuing relatively fine-grained motion control directives to various motion control subsystems. The rate at which directives are issued to the motion control subsystems 120 may vary in different embodiments—for example, in some implementations the motion selector 119 may issue one or more directives approximately every T milliseconds, where T is a configurable parameter. Of course, under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision making subsystem 116, and no new directives are needed to maintain the current velocity, the motion selector may not issue new directives every T milliseconds even though it may be capable of providing such directives at that rate.

The motion selector 119 may determine the content of the directives to be provided to the motion control subsystems (i.e., whether braking to slow speed by X units is required, whether acceleration by Y units is required, whether a turn or lane change is to be implemented, etc.) based on several inputs in the depicted embodiment, including conditional action and state sequences generated by the behavior planner 118, data obtained from sensor collection 112, and predictions of future states of the environment of the vehicle 110 generated by various reasoning models. The conditional action and state sequences, and/or the predictions of future states, may be generated with the help of graphs 190 in the depicted embodiments. In at least some embodiments, new versions of one or more of the reasoning algorithms used at subsystem 116 may be trained using data center-based resources 175, e.g., and updated versions may be obtained at the vehicle 110 via the communication devices 114 as needed.

Inputs may be collected at various sampling frequencies from individual sensors of the vehicle's sensor collection 112 in different embodiments, and utilized by the USGG 115, and/or the reasoning engines 117. In the depicted embodiment, at least a preliminary level of processing on the raw sensor data may be performed by output analyzers 165, which may for example attempt an initial identification of various types of objects defined in an object taxonomy developed for the vehicle. An example of such a taxonomy is discussed in further detail below. The local sensors 112, the preliminary processing output analyzers 165 and the external resources (such as map databases) accessed via communication devices 114 may represent respective types of data sources form which information may be combined and/or analyzed at the vehicle intelligence and motion decision making subsystem 116 in various embodiments. In one embodiment, the output from a given sensor or its corresponding preliminary output analyzer may be sampled at approximately K times the rate at the motion selector than the rate at which the output is sampled by the behavior planner, where K is a configurable parameter. Different sensors may be able to update their output at different maximum rates in some embodiments, and as a result the rate at which the output is obtained at the various decision making subsystem components may also vary from one sensor to another. A wide variety of sensors may be included in collection 112 in the depicted embodiment, including externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices, infrared sensors, ultrasonic sensors, and so on. In addition to conventional video and/or still cameras, in some embodiment near-infrared cameras and/or depth cameras may be used. In one embodiment, one or more of the communication devices 114 may also play the role of a sensor—e.g., signals regarding the state and/or plans of other autonomous or non-autonomous vehicles in the vicinity may be collected via any appropriate communication protocol. In various embodiments, uncertainty information pertaining to objects detected using the sensors may be included in graphs 190—e.g., the graph may indicate that a particular object represented by a node is a truck with 75% certainty, a bus with 15% certainty, etc.

In one approach used for managing the movements of vehicle 110, the behavior planner 118 may use the graphs 190 to help generate relatively longer-term plans comprising sequences of conditional actions and states which may be reached as a result of the actions, and provide the alternatives together with associated metadata (e.g., reward or value metrics indicating the "relative goodness" of the alternatives based on currently-known information) to the motion selector 119. The plans may be provided at a slower rate to the motion selector 119 than the rate at which directives 134 are expected to be provided to the control subsystems 120 in some embodiments (the slower rate may result, for example, from the amount of computations which have to be performed to generate the alternatives). In some embodiments, the behavior planner 118 may utilize one or more Monte Carlo Tree Search (MCTS) algorithms to generate the plans to be provided to the motion selector. MCTS is an approach for decision making, sometimes used in automated game player systems, which combines the generality of random simulation with the precision of tree search algorithms often employed in machine learning systems. MCTS comprises one example of a stochastic tree pruning algorithm; in at least some embodiments, deterministic pruning algorithms may be employed in addition to or instead of stochastic pruning algorithms.

In some embodiments, at least some of the computations involved in generating state predictions and trajectories at driving time of the autonomous vehicle 110 may be performed using remote resources. The communication devices 114 (which may comprise hardware and/or software components used for wireless or telephony-based communication channels/protocols of any appropriate types) may be used to transmit and receive the data corresponding to such remote operations, to obtain updates to the machine learning/reasoning models being used and so on. In some embodiments, portions or all of at least some graphs 190 may be transmitted to external locations such as data centers, e.g., for logging/debugging purposes and/or to perform certain types of decision making. Because the unified graphs combine information from a variety of sources, and about a variety of object types, into a single data structure which is used to make motion-related decisions, the task of debugging and analyzing such decisions may be simplified considerably as a result of logging the contents of the unified graphs, locally (on the vehicle itself) and/or remotely in some embodiments. The extent to which decision making is performed locally versus remotely may vary over time in some embodiments—e.g., if communication with a remote facility becomes difficult or unavailable, more decisions (of potentially lower complexity or duration) may be generated locally temporarily, until communication quality is restored. In one embodiment, regardless of whether decisions are generated at least in part locally or not, the communication devices 114 may be used to transmit data about the vehicle's state (and/or local actions taken in various states) including for example at least some scene graphs, to a remote data repository, where the data may later be analyzed and utilized to enhance the models and/or algorithms being employed.

In at least some embodiments, in addition to or instead of being used for online or real-time motion-related decision making, at least some of the graphs 190 may be used for other purposes such as the offline training of machine learning models (which may themselves be used, after the training is complete, for vehicle motion-related reasoning), updating tactical maps, etc. In some embodiments, at least a portion of such training or other offline tasks may be performed at data centers to which the graphs are transmitted from the ego vehicle, e.g., via communication devices 114. In at least one embodiment, at least a portion of such offline work may be performed at the ego vehicle itself. Thus, in various embodiments, operations of a variety of tasks pertaining to vehicle movements may be performed using the graph, including online decision making tasks as well as offline tasks such as model training, debugging/analyzing algorithms which were used for decision making, updating maps, etc.

Figure 2:
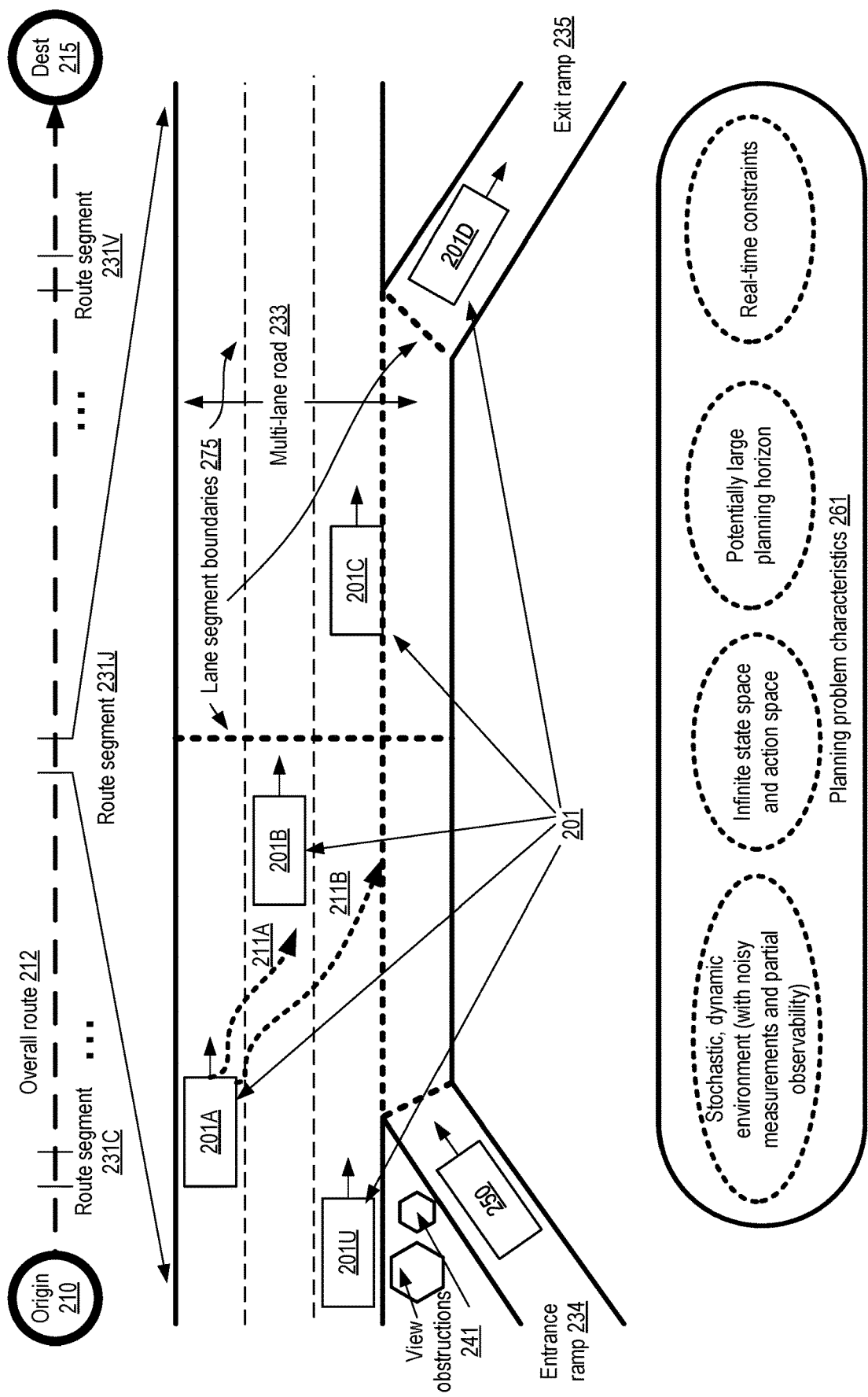
FIG. 2 illustrates an example decision making scenario for an autonomous vehicle, as well as general problem characteristics associated with such decision making scenarios, according to at least some embodiments.

FIG. 2 illustrates an example decision making scenario for an autonomous vehicle, as well as general problem characteristics associated with such decision making scenarios, according to at least some embodiments. A high-level overall route 212 for an autonomous vehicle 250 from an origin 210 to a destination 215 (labeled "Dest" in FIG. 2) may be identified prior to the start of a journey. The high-level route 212 may, for example, be identified using a network-accessible mapping service, and may comprise information such as a proposed set of highways/roads, the exits and entrances to be used for the highways/roads, and so on. In some cases the high-level route 212 may also comprise an estimated or targeted arrival time at the destination 215. The route 212 may comprise numerous sub-portions or segments 231, such as segments 231C, 231J and 231V. A given segment 231 may represent, for example, an entrance or turn onto some road or highway, some driving distance on the road or highway, and so on.

In the depicted example, route segment 213J comprises the use of an entrance ramp 234 by autonomous vehicle 250 to merge into a multi-lane road 233. Dashed lines 275 show example lane segment boundaries which may be defined, for example, in a tactical map in some embodiments. A tactical map may, for example, comprise a pre-prepared map that indicates the locations of at least some static objects that have been identified in a given area in various embodiments. Some tactical maps may comprise semantic information regarding the objects in such embodiments, which may be used for reasoning about the objects; the information contained in such tactical maps may not necessarily be restricted to geometric location data. At least some lane segment boundaries (e.g., the boundaries perpendicular to the flow of traffic) may be virtual in various embodiments; such boundaries may not be visible as lines on the road itself. An exit ramp 235 is located within a short distance of the entrance ramp 234 in the example. A number of other vehicles 201 (of which zero or more may be autonomous vehicles), such as vehicles 201A, 201B, 201C, 201D and 201U may be using the road 233 at or just before vehicle 250 is to enter the road, and may be close enough to the entrance ramp to be considered pertinent to the motion decisions made for vehicle 250. The general directions of motion of the vehicles 201 and 250 are indicated by the arrows—e.g., most of the vehicles shown are assumed to be generally proceeding from left to right in the view shown in FIG. 2. The decisions which need to be made with respect to autonomous vehicle 250 may include, for example, the speed at which the road should be entered, how long the vehicle 250 should remain in any given lane immediately after entering the road, whether and to what extent the vehicle's speed should be changed after the entrance, and so on.

Although experienced human drivers may find these kinds of decisions fairly straightforward to make, the task of automating such decisions in a timely and safe manner may be complicated. The general problem of making motion-related decisions for the autonomous vehicle may be summarized as follows. Given some level of understanding or knowledge about the "world" (static and dynamic objects in the nearby environment of the vehicle 250, as well as the properties of the vehicle's current position and movements), and given information about the destination 215 (including the high-level route 212), the decision making components of the vehicle 250 may be required to produce a sequence of trajectories for the vehicle that (a) arrive at the destination safely in a timely and efficient manner (e.g., meeting some desired fuel or battery usage targets), (b) are dynamically feasible (e.g., comply with various applicable physical laws), (c) follow traffic rules, and (d) provide a comfortable experience for the vehicle's occupants. Note that these goals may be prioritized in various orders relative to one another in different embodiments. In order to achieve such goals, in at least some embodiments techniques using unified graphs of the kind discussed in the context of FIG. 1 may be used to help reason about vehicle trajectories.

A number of problem characteristics 261 which tend to make the decision making for autonomous vehicles challenging are indicated in FIG. 2. First, the dynamically changing environment of vehicle 250 may be inherently stochastic rather than deterministic, with noisy/uncertain rather than full and accurate data (such as velocity, position, or heading) available with respect to other vehicles 201 and other relevant static objects (such as potholes, signs, etc.). In some cases, one or more objects 241 (e.g., static objects such as trees or signs) may partially block a view of the road. As a result, one or more vehicles such as 201U may be partially or fully unobserved during the time period in which the merge-related decisions for vehicle 250 may have to be made. Furthermore, the intentions or goals of other agents (e.g., the drivers of vehicles 201, or the decision making components of those vehicles 201 which happen to be automated vehicles) may be unknown and difficult to predict. For example, even if the current position and velocity of vehicle 201A is known, the agent controlling vehicle 201A may suddenly change vehicle 201A's trajectory to a different lane, as indicated by arrows 211A and 211B, and such a transition may affect the decisions made on behalf of autonomous vehicle 250. Second, many of the metrics or observations which may need to be considered when making the decisions, such as the velocities and relative distances between various vehicles, may take on continuous rather than discrete values, resulting in a theoretically infinite feasible space of possible states and actions.

The number of sequential actions which may need to be planned may be quite large, resulting in potentially large planning horizons. In principle, to achieve optimal decisions (where the definition of optimality may itself be non-trivial), individual actions and corresponding achievable states may have to be evaluated relative to one another with respect to the goals of the journey, and such comparisons may become computationally intractable depending on the number of alternatives being considered at each stage. Finally, because the vehicle 250 is moving, with a high (and therefore potentially dangerous) level of kinetic energy, the decisions may have to be made within tight real-time constraints, using limited computational resources. These characteristics, taken together, may make motion planning for autonomous vehicles an extremely difficult proposition.

Consequently, algorithms which simplify the representations and processing of the vehicle's environment information, such as the algorithms that generate and analyze unified scene graphs of the kind introduced above, may be extremely helpful for motion planning in various embodiments.

Figure 3:
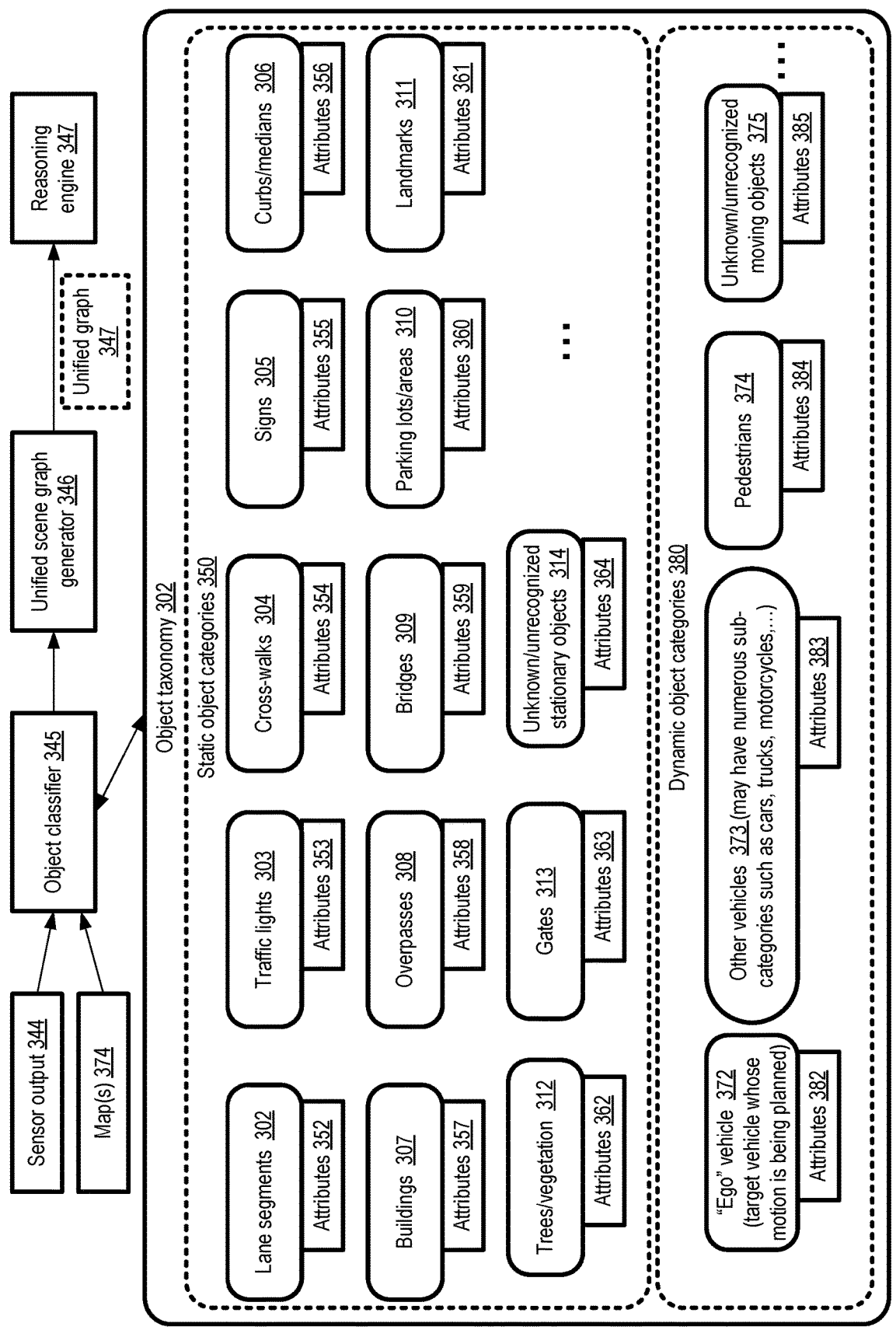
FIG. 3 provides an overview of an example object taxonomy that may be employed in some embodiments, according to at least some embodiments.

As indicated above, a wide variety of static and dynamic objects may be present in a vehicle's environment, for which nodes and edges may be created within unified scene graphs. FIG. 3 provides an overview of an example object taxonomy that may be employed in some embodiments, according to at least some embodiments. In the depicted embodiment, output 344 generated from a collection of sensors on the vehicle and/or one or more maps 375 may be used by a preliminary object classifier 345 to generate a list of objects whose categories or types are defined in taxonomy 302 and detected in the vehicle's environment. Note that maps 375 may not be required in at least some embodiments—instead, objects may be identified entirely based on sensor data analysis in such embodiments. The list of objects may be provided to the USGG 346, and used to populate one or more versions of a unified scene graph 347, which may in turn be provided to a reasoning engine 347. The reasoning engine 347 and the USGG 346 of the embodiment shown in FIG. 3 may have similar capabilities and features as the corresponding elements shown in FIG. 1. In some embodiments, the object classifier may be implemented as a sub-component of the USGG 346. In at least one embodiment, the USGG 346 and/or the reasoning engine 347 may include respective object classifier subcomponents—e.g., the initial set of objects may be refined and/or verified at several stages during the workflow of processing environmental information and planning vehicle movements.

Taxonomy 302 may include numerous types of static object categories 350 and dynamic object categories 352 in the depicted embodiment, for each of which a respective set of attributes may also be defined. For example, static object categories 350 may include, among others, lane segments 302 with attributes 352, traffic lights 303 with attributes 353, cross-walks 304 with attributes 354, signs 305 with attributes 355, curbs/medians 306 with attributes 356, overpasses 308 with attributes 358, bridges 309 with attributes 359, and/or parking lots or parking areas 310 with attributes 360 in at least some embodiments. In one embodiment, static objects for which information is to be captured for reasoning about vehicle movements may also include, for example, buildings 307 (which may be visible from the vehicle and/or adjacent to lanes on which the vehicle may be driven) with attributes 357, geographical or human-built landmarks 311 (e.g., mountains, statues, etc.) with attributes 361, trees or other vegetation elements 312 with attributes 362, gates 313 (such as railroad crossing gates) with attributes 363, and the like. In some cases, it may not be possible to classify a given static object among the well-defined object classes, in which case the object may at least temporarily be placed in the category 314 of unknown/unrecognized stationary objects in various embodiments. Note that at least in some embodiments, attributes 364 such as size, apparent distance, and the like may still be determined/estimated and stored for unrecognized static objects.

Dynamic object categories 380 may include, among others the "ego" or target vehicle 372 whose motion is being planned, other vehicles 373 which may include numerous sub-categories such as cars, buses, trucks, motorcycles, trains, bicycles and the like, pedestrians 374 as well as a default unknown/unrecognized moving objects category 375. In some embodiments, dynamic object categories may include various types of animals, including animals that are used for transportation (such as horses/camels), pets, or wildlife such as deer. Corresponding to individual ones of the categories of dynamic objects, a respective set of attributes (such as 382, 383, 384 and 385) may be defined within the taxonomy 302 in various embodiments. As in the case of the other vehicles category 373, in at least some embodiments, a hierarchy of sub-categories may be defined. In one embodiment, respective localized versions of object taxonomy 302 may be created and used, depending for example on the country or region in which the ego vehicle operates—e.g., some types of vehicles such as three-wheeled cars or scooters may be more likely to be encountered in some countries than others. The object taxonomy 302, and corresponding object recognition algorithms (e.g., deep neural network based algorithms) utilized by object classifier 345 may be downloaded to the ego vehicle in at least some embodiments.

Figure 4:
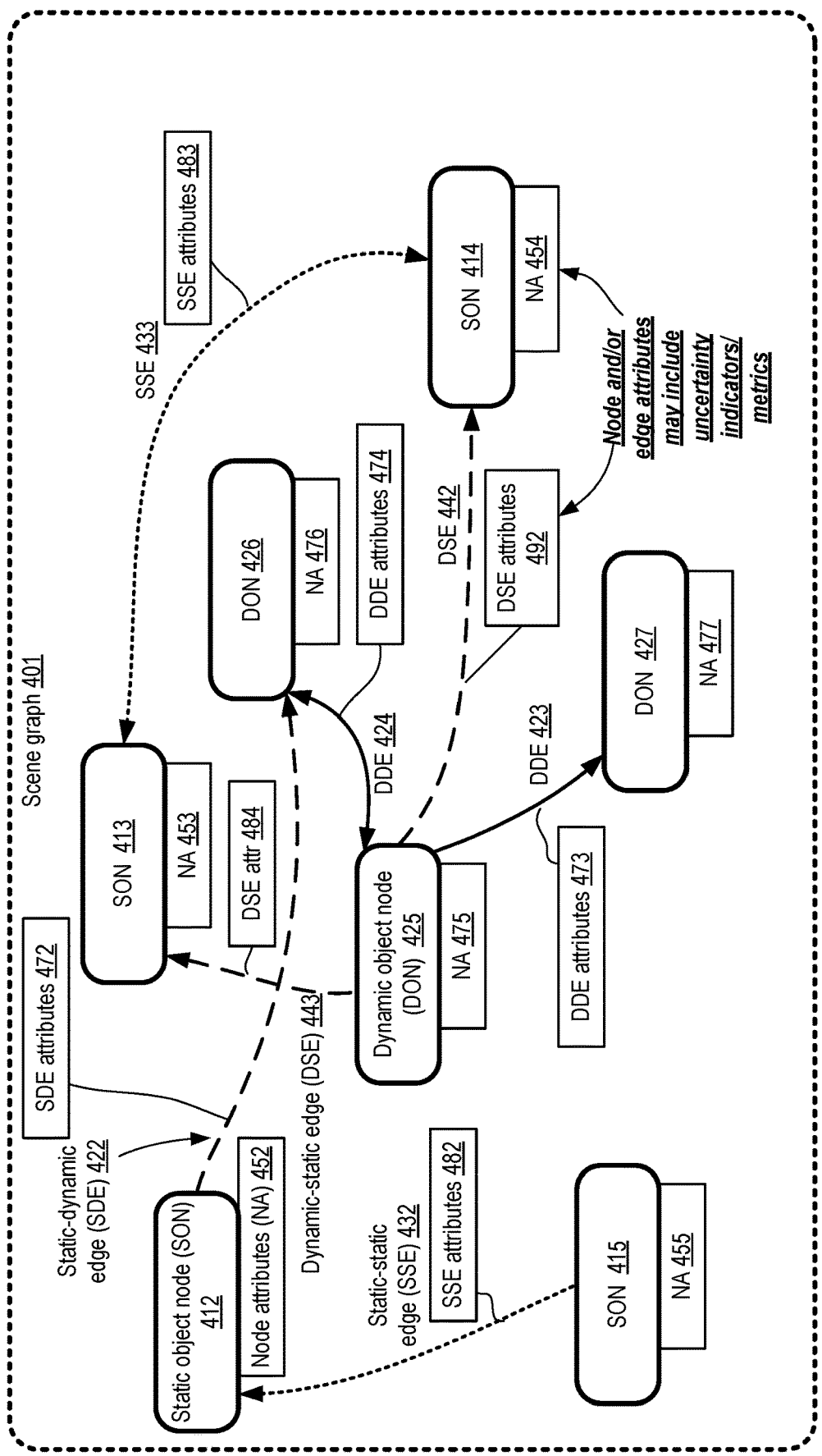
FIG. 4 illustrates examples of the types of nodes and edges that may be included in a unified scene graph, according to at least some embodiments.

FIG. 4 illustrates examples of the types of nodes and edges that may be included in a unified scene graph, according to at least some embodiments. To avoid clutter while illustrating the concepts involved, a very small example scene graph 401 is depicted in FIG. 4; in practice, scene graphs may comprise hundreds of nodes in some environments. As shown scene graph 401 may include static object nodes (SONs) 412, 415, 413 and 414, as well as dynamic object nodes (DONs) 425, 426 and 427. With respect to each of the nodes, a respective set of node attributes (NA) may be stored as part of, or referenced from the data structure used for the graph in the depicted embodiment. For example, node attributes 452, 455, 453, 475, 476, 477 and 454 may respectively be stored for SON 412, SON 415, SON 413, DON 425, DON 426, DON 427 and SON 414.

As mentioned earlier, when constructing a unified scene graph for use by reasoning engines at the ego vehicle, the set of edges actually included may be much smaller than the maximum possible number of edges in various embodiments. For example, in the depicted example scenario, each of the seven nodes may potentially be linked to each of the remaining nodes, but graph 401 only comprises six edges. In at least some embodiments, geometric analysis or estimation algorithms (e.g., bounding volume hierarchy algorithms) may be used to identify, for a given node, which subset of other nodes (if any) is relevant with respect to motion planning if the ego vehicle, and edges linking only the nodes of the relevant subset to the given node may be incorporated in the graph 401. Relevant nodes may be selected base not just on relative positions in some embodiments, but also on dynamic attributes such as velocity, momentum, acceleration and the like. For example, if the velocity of an object is such that it is approaching the ego or target vehicle rapidly, the object may be considered relevant to the ego vehicle even if it is currently far away, so an edge linking the node representing that object and the node representing the ego vehicle may be included in the graph. In various embodiments, at least some of the edges may have an associated direction (or directions)—for example, if a given edge is used to represent the relationship that node N1 is "to-the-left-of" node N2, the edge may lead from N1 to N2 and be labeled with the name "LEFT" in some embodiments. Respective sets of attributes may be stored (or referenced) for different categories of edges—e.g., static-static edges (SSEs) which lead from one SON to another SON, static-dynamic edges (SDEs) which lead from an SON to a DON, dynamic-static edges (DSEs) which lead from a DON to an SON, and dynamic-dynamic edges (DDEs) which link two DONs. Thus SSE has attributes 482, SDE 422 has attributes 472, DSE 443 has attributes 484, SSE 433 has attributes 483, DDE 424 has attributes 474, DSE 442 has attributes 492 and DDE 423 has attributes 473 in the depicted example graph 401.

As indicated in FIG. 4, at least some node attributes and/or edge attributes may include uncertainty indicators or metrics in various embodiments. With respect to the objects represented by nodes, the uncertainty metrics may for example indicate that there is some estimated probability of incorrect identification of the objects—e.g., a small motorcycle or electric scooter may be misidentified as a bicycle or vice versa under some conditions. The sources of the uncertainty information stored in the graph 401 may vary for different types of nodes and edges, and may depend at least in part on factors such as the inherent uncertainties/error ranges of measurements feasible via different types of on-board sensor devices of the ego vehicle, the granularity and accuracy of a tactical map (if a tactical map is being used), the specific algorithms used to combine/aggregate baseline uncertainties when generating joint estimates, the initially estimated distances/speeds of various objects and so on.

Figure 5:
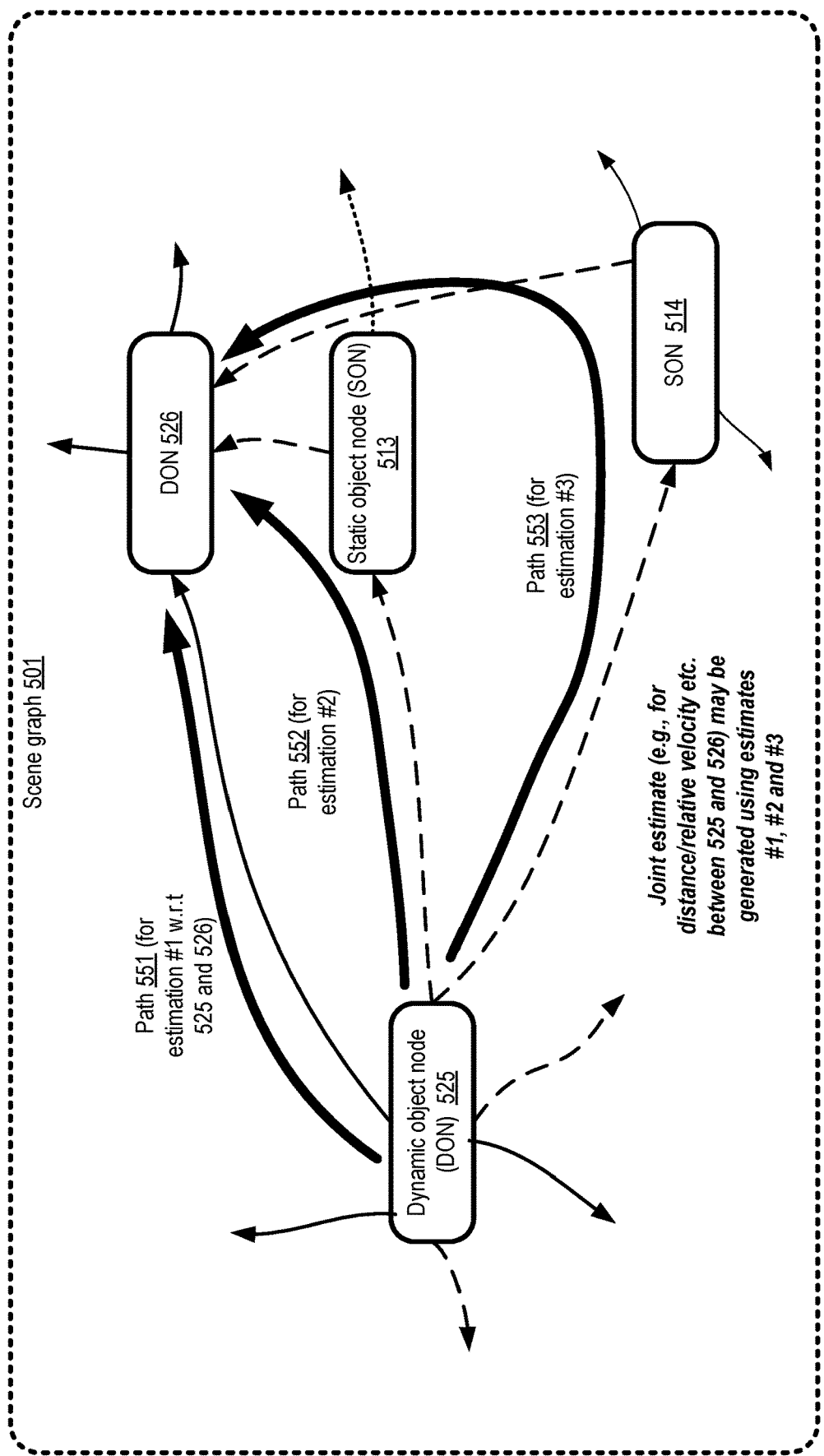
FIG. 5 illustrates a simple example of the traversal of multiple paths between a pair of nodes of a unified scene graph for obtaining a joint estimate for one or more quantities, according to at least some embodiments.

In some cases, it may be possible to generate estimates about a given attribute (such as a distance between two objects, or a velocity with which one object is nearing another) using several different paths within a graph. FIG. 5 illustrates a simple example of the traversal of multiple paths between a pair of nodes of a unified scene graph for obtaining a joint estimate for one or more quantities, according to at least some embodiments. Two dynamic object nodes (DONs) 525 and 526, and two static object nodes (SONs) 513 and 514 of a larger graph 501 are shown by way of example in the depicted embodiment. Based on the sensor and other data available, edges may have been created between each pair of the four nodes in graph 501. Individual edges may include attributes about, for example, the distances between the objects whose nodes are linked by the edges, velocities (in the case where at least one node linked by an edge is a dynamic node) at which the objects are approaching each other or moving away from each other, and so on.

As discussed earlier, at least some of the edges may have uncertainty metrics associated with them, indicating that the quantities such as distances, relative velocities etc. represented in the edges may not necessarily be completely accurate. Furthermore, in some cases, one or more of the DONs and/or SONs themselves may have uncertainties associated with them, indicating that the identities of the objects represented may not be known with 100% accuracy or correctness.

In scenarios where several different paths may be traversed between a given pair of nodes, the information stored for the edges along the paths may be used to derive joint estimates of at least some quantities such as distance, velocities and the like. For example, between DON 525 and DON 526 in graph 501, paths 551, 552 and 553 may be traversed by an estimation algorithm. One estimate of the distance between the objects represented by DONs 525 and 526 may be obtained from the distance represented in the single edge of path 551, for example. Another estimate may be obtained performing geometric/trigonometric calculations using the two distances corresponding to the edges between DON 525 and SON 513 along path 552, and a third estimate may be obtained using geometric/trigonometric calculations using the two distances corresponding to edges between DON 525 and SON 514 and between SON 514 and DON 526. The uncertainties of each of the edges may be aggregated or otherwise taken into account to arrive at the uncertainty of the joint estimate of distance or similar attributes in various embodiments. In at least some embodiments, when multiple paths including a single edge (as in the case of path 511) between a pair of nodes are available as in the scenario depicted in FIG. 5, the joint estimates obtained by traversing the different paths may be used to update the attributes of the single edge—e.g., after a joint estimate of distance is obtained, the distance attribute of the single edge may be set to the joint estimate.

FIG. 6 illustrates a simple example of a unified scene graph, according to at least some embodiments. In the depicted example, a view of a portion of a two-lane road 602 is shown, with the ego vehicle EV9 moving forward (which corresponds to apparent movement from left to right in the top-down view shown) in a lane comprising lane segments LS1, LS2, LS3 and LS4, with EV9 being currently positioned in lane segment LS1. In the other lane, which comprises lane segments LS5, LS6, LS7 and LS8, another vehicle OV11 is also moving in the same direction as EV9, and OV11 is currently in lane segment LS8. A cross-walk CS10 overlaps with part of LS2 and with part of LS6, and a pedestrian is currently walking in the portion of CS10 which overlaps with lane segment LS2, headed for lane segment LS6.

A total of nine static objects and three dynamic objects may be identified in the depicted example for inclusion in the corresponding example unified scene graph 610. The static objects may include the eight lane segments and the cross-walk, while the dynamic elements may include the ego vehicle, the other vehicle and the pedestrian. A number of edges may be included in graph 610, e.g., based on geometric estimates of the positions/velocities of different objects relative to one another. As mentioned earlier, at least some of the possible edges may not be included based on geometric analysis—e.g., because lane segment LS1 is (relatively) far away from the other vehicle OV11, and also from lane segments LS3, LS4, LS6, LS7 and LS8, no edges between the nodes representing those objects and the node for LS1 may be included. Note that even though the other vehicle OV11 is relatively far away from EV9, an edge linking the two is still included in graph 610, because the relative velocities of the two may make it possible that the two vehicles may approach each other fairly rapidly. Legend 650 shows the different types of edges, including (for edges incident on static objects) positional information such as left, right, next (with respect to direction of allowed traffic), previous (with respect to direction of allowed traffic), and overlap. To avoid clutter, only a few of the positional information labels are shown in graph 610.

Unified graphs of the kind discussed above may be used to store and process any desired combination of attributes for any desired types of objects relevant to vehicle environments in different embodiments. FIG. 7 illustrates example attributes of nodes and edges of a unified scene graph, according to at least some embodiments. For a given lane segment 702 (one example of a static object), for example, the graph may include attributes indicating the geometries 702-1 (e.g., position, shape etc.) of the left and right boundaries of the lane segment, topological connections 702-2 indicating other static or dynamic objects that may be to the left (L), right (R), next (N) in one or more directions, previous (P) in one or more directions, or overlapping (O) with the lane segment in the depicted embodiment. In at least some embodiments, a respective Boolean attribute 702-3 and/or 702-6 may be used to indicate whether the lane segment is controlled by a traffic light or whether the lane segment is part of a parking lot, for example. In some embodiments, a speed limit 702-4 attribute, an attribute 702-5 indicating permitted traffic directions and/or an attribute 702-7 indicating additional traversal restrictions (e.g., whether one is a vehicle is permitted to enter the lane segment from the left or right) may also be stored. Respective uncertainty metrics may be stored for various attributes, such as 702-1, in some embodiments, indicating that there is some probability of the stored values of the attributes being incorrect, and/or a range within which the attribute values may lie with a particular confidence level.

With respect to a given dynamic or moving object 704, the attributes may include an attribute type 704-1 (e.g., car, truck, pedestrian, train, etc.), a speed/velocity 704-2, acceleration 704-3, direction of movement 704-4, LIDAR/radar data 704-5, camera-based distance from the ego vehicle 704-6, a geometric bounding box 704-7, a center-of-mass location 704-8, and a simplified trajectory history 704-9 (e.g., indicating some number of recent changes, if any were detected, to speed, direction, acceleration and the like) in some embodiments. Various ones of the attributes of the dynamic objects may have associated uncertainty metrics as well.

For a given edge 706 leading from one static object node SON1 to another static object node SON2, the attributes included in the unified scene graph may, for example, include a relative position 706-2 (e.g., whether the object represented by SON1 is to the left of, to the right of, next along some direction, previous along some direction, or overlapping with, the object represented by SON2), additional geometric information 706-2 such as the distance between the objects represented by SON1 and SON2, and in some cases traversal restrictions 706-3 (such as yield requirements in scenarios in which SO1 or SO2 represent lane segments, and the like) in various embodiments.

With respect to a static-dynamic edge or dynamic-static edge 708 (leading from a static object node SON1 to a dynamic object node DON1, or from DON1 to SON1), in some embodiments the unified graph may comprise attribute 708-1 representing an estimated distance between the two objects linked by the edge, as well as the source(s) 708-2 of the distance estimates such as camera, radar, LIDAR etc. Distances may be determined and expressed using any of a number of approaches in various embodiments. In some embodiments, a lane-based curvilinear space may be used, in which units of distance along lanes (which may not necessarily be straight) and logically perpendicular to lanes may be used. In other embodiments, a semantic representation of distance may be used: e.g., the absolute physical distance between two vehicles passing each other in opposite directions along a highway with an impenetrable barrier between the two directions of travel may be quite small, but the more relevant distance measure (e.g., useful for the purposes of determining whether a collision between the two vehicles may occur) may take the presence of the barrier into account. In such an example scenario, the semantic distance may be much further than the physical distance, since in order for a collision to occur, at least one of the vehicles may have to take an exit and enter the lane occupied by the other vehicle. In at least one embodiment, Euclidean distance may also be estimated and stored in the graph. In some embodiments, multiple types of distance data, estimated using these different approaches, may be stored. In at least one embodiment, in some cases, instead of or in addition to having sensor data that may directly indicate the distance with some uncertainty, the distance between the two objects may be estimated or inferred indirectly, e.g., using joint estimation of the kind discussed above. In one such embodiment, the fact that the distance is estimated indirectly or deduced may be indicated via a particular setting of attribute 708-2. In some embodiments, an attribute 708-3 indicating an expected interaction type between the static and dynamic object whose relationship is represented by edge 708 may also be stored in the graph. Attribute 708-3 may, for example, indicate whether the dynamic object is on or nearing the static object, or whether no direct interaction is anticipated (as may be indicated by setting attribute 708-3 to "none").

For edges 710 linking nodes representing a pair of dynamic objects, at least some similar attributes to those shown for edges 708 may be included in the graph in various embodiments. For example, attribute 710-1 representing an estimated distance, attribute 710-2 indicating the source(s) of the distance estimate, and attribute 710-3 indicating an anticipated interaction may be included in the depicted embodiment. In at least some embodiments, an additional attribute 710-4 indicating a minimum distance to be maintained between the two objects (which may be controlled or governed by rules or laws of the jurisdiction in which the objects are currently located) whose nodes are linked by a dynamic-dynamic edge 710 may be stored in the graph as well. In one such embodiment, the relevant laws/rules may be downloaded to the target or ego vehicle, e.g., before the start of a particular journey or as the vehicle crosses jurisdictional boundaries, in a manner analogous to the way in which tactical maps may be downloaded in advance of a journey and updated as the journey proceeds. In at least some embodiments, the observability of one object from another (e.g., how visible is object B from object A) may be represented as an attribute of an edge linking nodes representing the two objects. As mentioned earlier, in various embodiments, temporal information may be included among the attributes of at least some nodes or edges of a unified graph (indicating for example when the other information stored for the node or edge was obtained or processed). In some cases, multiple nodes representing the same object at different times (or time ranges), or multiple edges representing the same relationship at different times (or time ranges), may be included within a given graph. It is noted that the kinds of attributes shown in FIG. 7 are not intended to be limiting; in various embodiments, other combinations of attributes may be stored for various types of nodes and edges of a unified scene graph. In some embodiments, at least some attributes may be locale-dependent—e.g., the laws/rules/customs regarding permitted traffic directions, crossing from one lane into another and the like may differ from one region or country to another, and the graph generation algorithms may take such differences into account.

Figure 8:
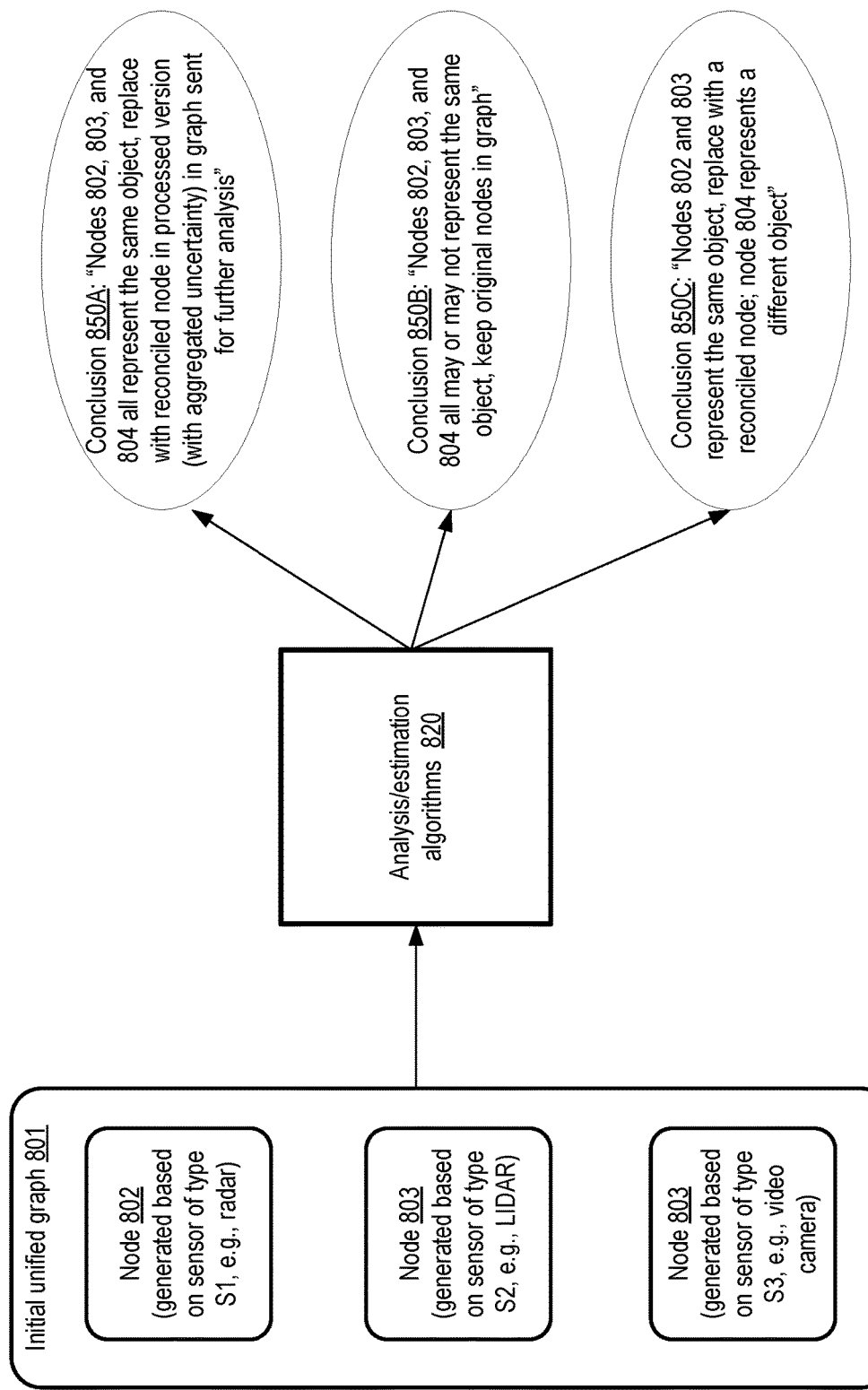
FIG. 8 illustrates an example scenario in which reconciliation analysis may be performed with respect to a subset of nodes of a unified scene graph, according to at least some embodiments.

In at least one embodiment, the same type of information (e.g., indicative of the identity of a given object, the distance between two objects, or speed of a given object) obtained from multiple sources at a target vehicle may be incorporated within a given unified scene graph, and the sources may not necessarily agree with one another in all cases. As such, the information from the different sources may have to be combined or reconciled. FIG. 8 illustrates an example scenario in which reconciliation analysis may be performed with respect to a subset of nodes of a unified scene graph, according to at least some embodiments. In the depicted embodiment, an initial version 801 of a unified scene graph may comprise three nodes 802, 803 and 804. The three nodes may have been generated based at least in part on an initial analysis of sensor data from respective types of sensors S1, S2 and S3 in the depicted embodiment—e.g., one node may have been created based on radar data, another based on LIDAR data, and the third based on video camera data.

Analysis/estimation algorithms 820 may be used in the depicted embodiment to determine whether any combination of the three nodes 802, 803 and 804 may actually represent the same underlying real-world object (i.e., that a probability that the nodes refer to the same object exceeds some pre-selected threshold), and a decision may be made as to whether some of the nodes should be replaced by a reconciliation node which is based on the combination of information associated with the original nodes. For example, based on the algorithms, an example conclusion 850A may be reached in some cases that (a) the three nodes 802, 803 and 804 all represent the same object with a probability higher than a threshold, and (b) the three nodes should be replaced by a single reconciled node in the version of the graph passed on to a reasoning engine for further analysis. In other cases, as in example conclusion 850B, (a) the three nodes may be deemed to represent the same underlying object, but (b) a decision to retain the original nodes may be made, e.g., because the attributes stored for the nodes still include information that may be useful in separate form for the reasoning engine. In yet another example conclusion 850C, (a) two of the nodes (802 and 803) may be deemed to represent the same object, while node 804 may be deemed to represent a different object, and (b) the two nodes corresponding to the same object may be replaced by a reconciled node, while the third node may be retained in its original form in the version of the graph passed on for further reasoning and analysis. Of course, other example conclusions (such as the conclusion that all three nodes refer to different objects) may be reached in some cases.

A similar type of analysis may be performed in some embodiments for edges as well as for nodes. In at least some embodiments, when generating a reconciliation or replacement node (or edge), the respective uncertainty metrics for the different nodes being reconciled may be aggregated or mathematically combined using some selected aggregation technique (e.g., when combining nodes N1 and N2 with uncertainties U1 and U2, in some embodiments the smaller of the two uncertainties may be used for the reconciliation node, or the average of the two uncertainties may be used). As such, one or more attribute values of a reconciled node/edge may be obtained using an aggregation function applied to corresponding attribute values of the original pre-reconciliation nodes/edges. In some embodiments, different levels of reconciliation analysis may be performed at the unified scene graph generator (USGG) for different types of nodes/edges—e.g., static nodes and static-static edges may be analyzed for potential reconciliation at the USGG, while dynamic nodes/edges may be analyzed for potential reconciliation at a reasoning engine.

In some embodiments, a broader approach may be taken with respect to reconciling information contained in the edges and/or nodes of the graph. Instead of simply combining nodes based on an analysis of current attribute values, historical or temporal data stored with the nodes/edges may be taken into account in such embodiments. For example, consider a scenario in which a node N1 represents an object O1 as of a time range T1, while node N2 represents the same object O1 as of a different time range T2. Based at least on an analysis that takes the two sets of temporal data (the ranges T1 and T2) into account, a reconciliation node may be generated to replace N1 and N2 in some embodiments. Generally speaking, any of a variety of algorithms may be used to prune/reconcile potentially redundant nodes/edges of a graph in different embodiments; depending on the types of nodes/edges being considered, some algorithms may take timing information into account, while others may not.

Figure 9:
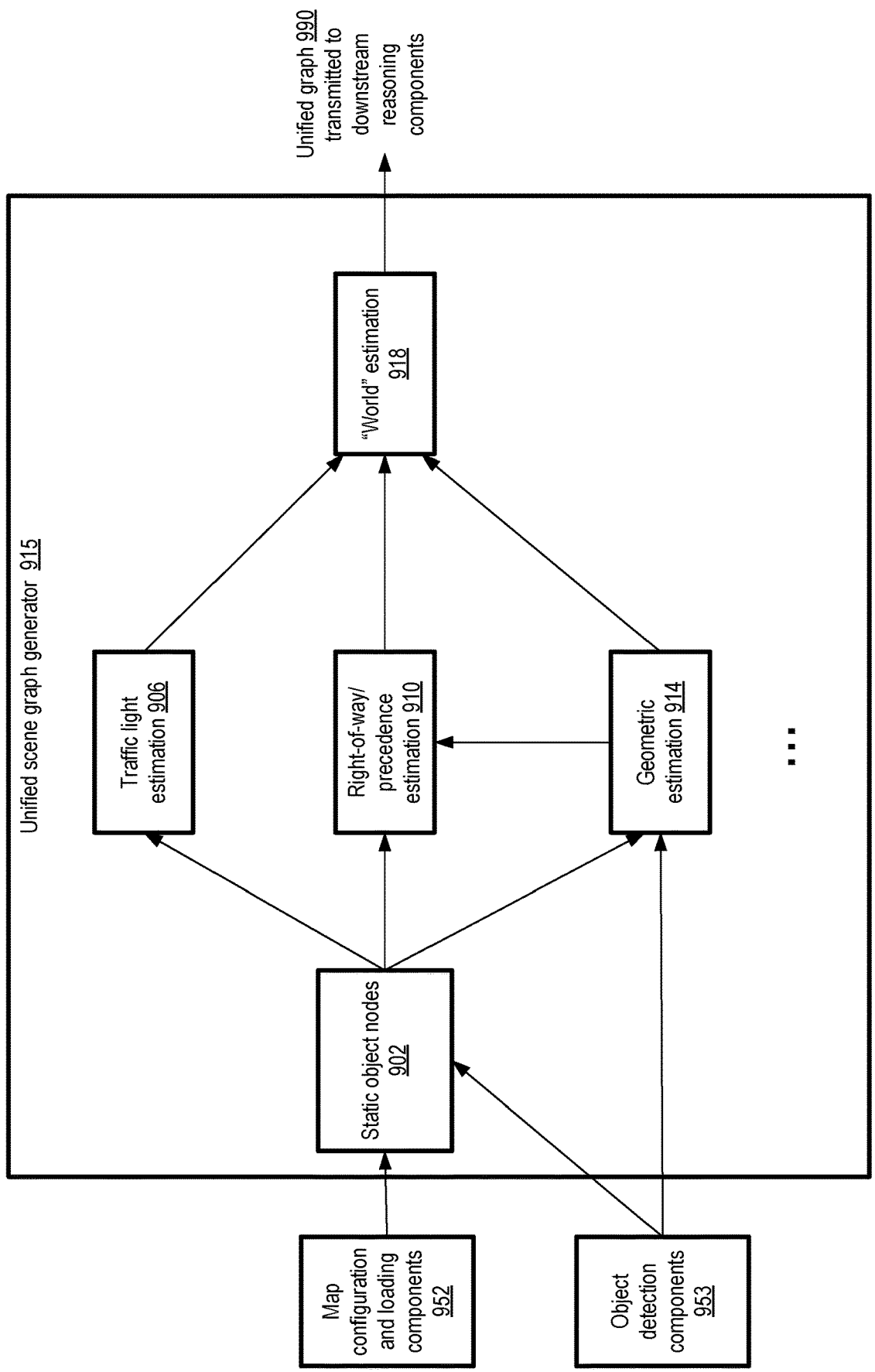
FIG. 9 illustrates an example scenario in which a composite unified scene graph representing a "world" estimate for a vehicle may be generated using several different types of estimation techniques, according to at least some embodiments.

As mentioned above, in some embodiments one or more estimation algorithms may be implemented at a unified scene graph generator, e.g., as part of a workflow involving the transformation of an initial version of a scene graph into a version that is more useful for the types of queries and analysis needed to plan the vehicle's trajectories by a reasoning engine. FIG. 9 illustrates an example scenario in which a composite unified scene graph representing a "world" estimate for a vehicle may be generated using several different types of estimation techniques, according to at least some embodiments. As shown, at least two types of inputs may be obtained at a unified scene graph generator 915 (which may be similar in capabilities and features to the USGG 115 of FIG. 1) in the depicted embodiment. Map configuration and loading components 952 may provide a tactical map comprising representations of static objects expected to be in the vicinity of a target or ego vehicle during some portion of a journey, and object detection components 953 may provide indications of various static and dynamic objects (with associated uncertainties) detected in the environment of the vehicle in various embodiments. As discussed earlier, the target vehicle may be equipped with a variety of sensor devices, including for example cameras, radar devices, LIDAR devices, infra-red devices, ultrasonic devices, and the like in different embodiments, for various ones of which a respective raw data analysis may be performed (e.g., using output analyzers 165 of the kind shown in FIG. 1) to obtain a preliminary identification of objects in the vehicle's vicinity.

Based at least in part on the input data received from one or both types of data sources (map components 952 and/or object detection components 953), a set of static object nodes 902 may be generated in the depicted embodiment. Geometric estimation algorithms 914 may be used to determine, for individual ones of the static and dynamic objects detected in the environment of the vehicle, which other nodes are relevant enough for edges to be included in the unified scene graph. Any combination of a number of different algorithms may be employed for geometric estimation in different embodiments, including for example bounding volume hierarchy (BVH) algorithms. In one such BVH algorithm, for example, a tree whose leaf nodes comprise respective bounding volumes for individual ones of at least some of the detected static and dynamic objects may first be constructed. Then, the leaf nodes may be grouped within larger bounding volumes (corresponding to non-leaf nodes), and such grouping may be performed recursively up the tree. Objects which lie within a particular bounding volume with respect to a given object may be identified as candidates for inclusion of corresponding edges in the unified scene graph in at least some embodiments. The dimensions of the bounding volume used to determine relevance may vary for different types of objects in various embodiments.

In the embodiment depicted in FIG. 9, if one or more traffic lights are detected in the environment of the vehicle, traffic light estimation 906 may involve associating the detected traffic lights with objects that are included in the map obtained from components 952. In addition, the state of the traffic light(s)—e.g., whether the light is green, red or yellow with respect to one or more directions of travel, the phasing or sequencing characteristics of the light (e.g., whether the light is flashing red, flashing yellow, etc., as opposed to being in a non-flashing state), and/or what the next expected traffic light transition is (e.g., yellow-to-red)—may also be estimated in various embodiments. If the ego/target vehicle (or other vehicles detected in the environment) is near a stop sign or other traffic management elements which influence the right-of-way of the vehicle(s), right-of-way/precedence estimation algorithms 910 may be employed to determine which of the vehicle(s) have to yield to other vehicles (if any), and/or the specific order in which the different vehicles are permitted to proceed in the depicted embodiment. Output from the geometric estimation 914 may be used as input for the right-of-way/precedence estimation 910 in at least some embodiments, e.g., to identify the specific set of vehicles for which the precedence-related analysis is to be performed.

The outputs of the traffic light estimation 906, the precedence estimation 910, and the geometric estimation 914 (and/or one or more additional estimators not shown in FIG. 9) may be processed at a "world" estimation subcomponent 918 in various embodiments. In effect, the world estimator may generate a unified scene graph 990 which represents all the relevant objects and relationships (with associated uncertainty metrics for at least some nodes/edges) identified with respect to at least the target or ego vehicle using the inputs 952 and 953 and the subsequent estimation algorithms. As indicated in FIG. 9, a number of different versions of the scene graph, each involving different levels of processing/estimation with respect to one or more types of nodes or edges, may be prepared before the overall or final unified world graph is produced in at least some embodiments. The unified graph 990 may be sparse in various embodiments, in that during the course of the estimation, only a relatively small number of edges (compared to the total number of possible edges) may be incorporated into the graph, e.g., based at least in part on geometric analysis which determines for a given object the set of other objects that are close enough (or moving rapidly enough) to be relevant. Any of a number of different types of efficient data structures or formats, such as compressed spare column (CSC) format, compressed sparse row (CSR) format or the like may be employed in various embodiments for the unified scene graph 990. The graph 990 may be transmitted from the USGG 915 to downstream reasoning components in various embodiments. In at least some embodiments, new versions of the graph 990 may be generated and provided to downstream reasoning components at a selected rate, e.g., once every T milliseconds, as the target vehicle moves, as new dynamic objects are detected, and/or as new map information is received at the target vehicle.

Figure 10:
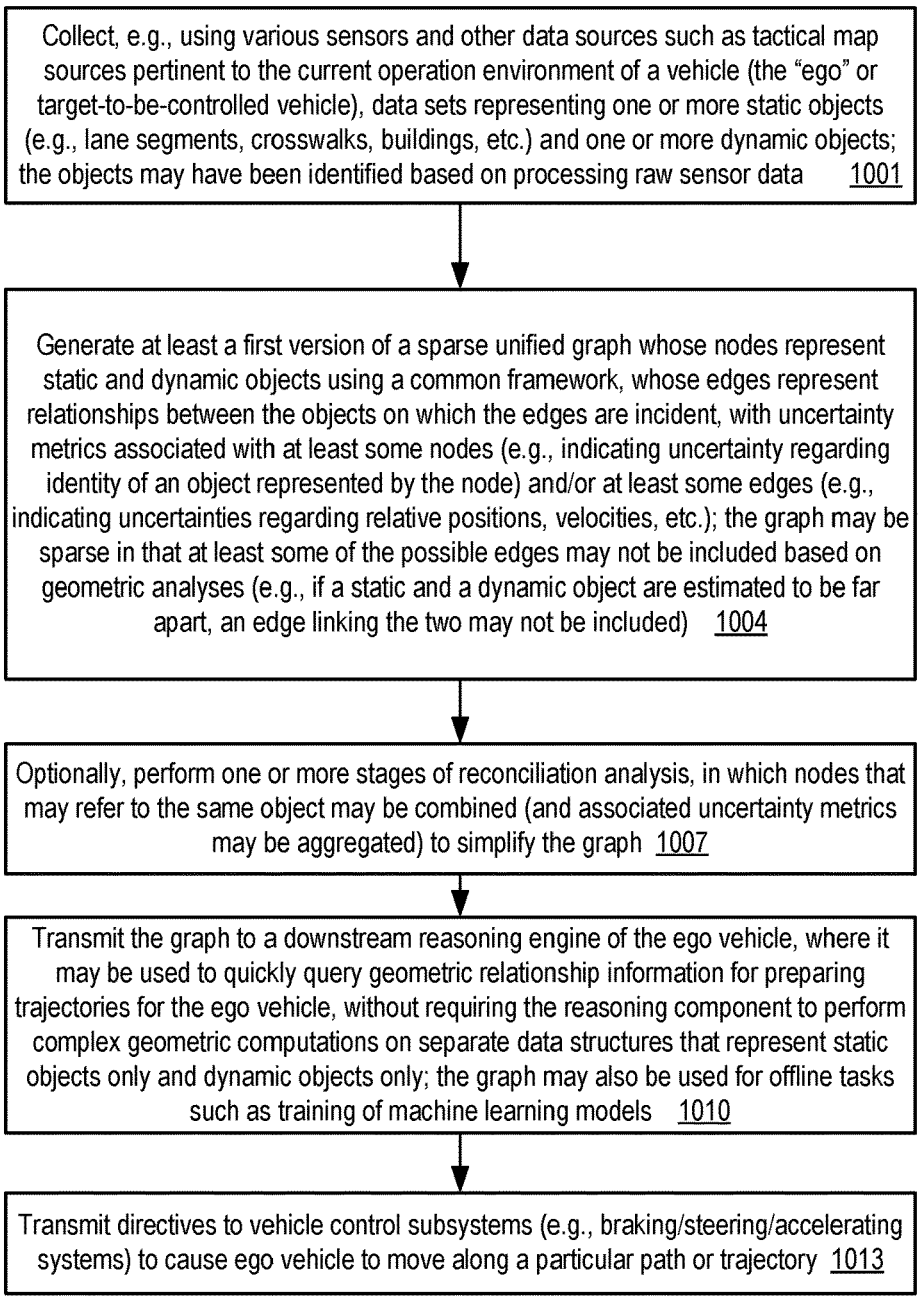
FIG. 10 is a flow diagram illustrating aspects of operations which may be performed to generate and utilize unified scene graphs, according to at least some embodiments.

FIG. 10 is a flow diagram illustrating aspects of operations which may be performed to generate and utilize unified scene graphs, according to at least some embodiments. As shown in element 1001, data sets representing one or more static objects (e.g., lane segments, crosswalks, buildings, etc.) and one or more dynamic objects may be collected, e.g., at a unified scene graph generator incorporated within a vehicle (an "ego" or target vehicle whose motion is to planned) in the depicted embodiment. The data sets may be obtained, for example, using a variety of sensors and other data sources such as tactical map sources pertinent to the current operation environment of the target vehicle in the depicted embodiment. At least some of the objects may have been identified based on one or more initial stages of processing raw sensor data, e.g., using object recognition algorithms applied to images collected from cameras, radar data collected at one or more radar devices, LIDAR data collected at one or more LIDAR devices, etc.

As shown in element 1004, at least a first version of a sparse unified graph whose nodes represent static and dynamic objects using a common framework, and whose edges represent relationships between the objects on which the edges are incident may be generated in various embodiments. Respective uncertainty metrics may be associated with at least some nodes (e.g., indicating uncertainty regarding identity of an object represented by the node) and/or at least some edges (e.g., indicating uncertainties regarding relative positions, velocities, etc.). The graph may be deemed as a sparse graph in that at least some of the possible edges may not be included based on geometric analyses (e.g., if a static and a dynamic object are estimated to be far apart, an edge linking the nodes for them may not be included, or if one dynamic object is moving away from another, an edge linking the two dynamic objects may not be included).

An initial version of the unified scene graph may be transformed and/or improved in various ways in different embodiments, e.g., using one or more estimation algorithms or other processing/analysis algorithms. Optionally, in some embodiments, one or more stages of reconciliation analysis may be performed (element 1007) as discussed earlier, in which nodes that may refer to the same object may be combined (and associated uncertainty metrics may be aggregated) to simplify the graph.

At least some version of the graph may be transmitted to a downstream reasoning engine of the ego/target vehicle in the depicted embodiment (element 1010). There, it may for example be used to quickly query geometric relationship information for planning/preparing trajectories for the ego vehicle, without requiring the reasoning component to perform complex geometric computations on separate data structures that represent static objects only and dynamic objects only. As such, the unification of information pertaining to static and dynamic objects within the same sparse graph data structure may help reduce the amount of computation that has to be performed at the reasoning engine responsible for motion planning of the target vehicle in various embodiments—in effect, at least some of the geometry-related processing may already have been performed at the scene graph generator, with the results of the geometric processing incorporated into an easy-to-traverse graph. Furthermore, such unification may also have the benefit that various types of objects may be represented consistently (e.g., using a common "node" abstraction), thereby simplifying the processing of the data. In at least some embodiments, as mentioned earlier, a unified graph may be used for operations of other types of tasks related to vehicle movements, such as for offline training of machine learning models, debugging/analysis of algorithms used for vehicle motion-related decision making, etc.

Based at least in part on the reasoning performed at the downstream reasoning components, a trajectory for the target vehicle may be generated, and a motion control directive to accomplish the trajectory may be transmitted to the vehicle's control subsystems (such as braking/steering/acceleration subsystems) in various embodiments (element 1013). The operations corresponding to elements 1001 onwards may be performed iteratively in various embodiments—e.g., as additional sensor data is obtained, new unified scene graphs may be generated with some selected frequency and used to reason about the future movements of the vehicle.

It is noted that in various embodiments, at least some operations other than those illustrated in the flow diagram of FIG. 10 may be used to implement the unified scene graph-based decision making techniques for vehicle motion control described above. Some of the operations shown may not be implemented in some embodiments or may be implemented in a different order, or in parallel rather than sequentially.

Figure 11:
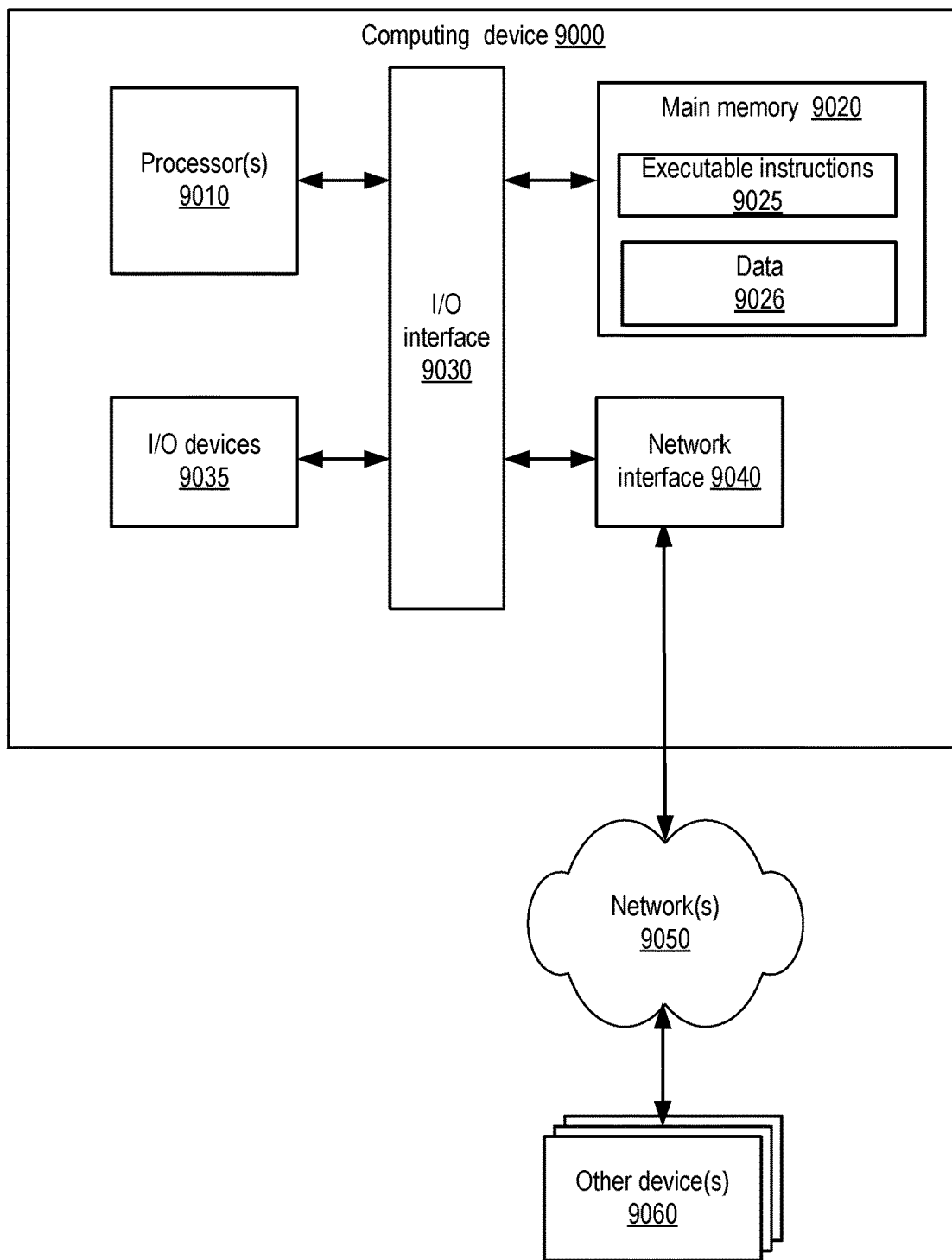
FIG. 11 is a block diagram illustrating an example computing device that may be used in at least some embodiments.

In at least some embodiments, a set of computing devices that implements a portion or all of one or more of the graph generation, estimation, reasoning and motion decision-making technologies described herein, including the techniques to collect, obtain or process sensor signals of various types, and/or to produce and process unified scene graphs that incorporate information about static and dynamic objects, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using embedded systems, storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, at one or more computing devices:
      obtaining respective indications of (a) one or more static objects in an operation environment of a first vehicle and (b) one or more dynamic objects in the operation environment;
      generating a graph comprising a plurality of nodes and a plurality of edges, wherein a first node of the graph represents the first vehicle, wherein a second node of the graph represents a static object of the one or more static objects, wherein a third node of the graph represents a dynamic object of the one or more dynamic objects, wherein a first edge between a first pair of nodes of the graph represents a first relationship between a pair of objects represented by the first pair of nodes, wherein at least one object of the pair of objects represented by the first pair of nodes is the first vehicle or the dynamic object, wherein the graph includes an indication of a first uncertainty metric associated with the first relationship, and wherein generating the graph comprises determining, based on a geometric analysis, that an edge between a second pair of nodes is not to be included in the graph;

preparing, using at least the generated graph, a first trajectory of the first vehicle; and transmitting, to a motion control subsystem of the vehicle, one or more directives to move the first vehicle according to the first trajectory.

2. The method as recited in claim 1, wherein preparing the first trajectory comprises obtaining geometric information for at least a portion of a motion planning-related reasoning algorithm from the graph, without performing a geometric computation that accesses a first data structure representing the static objects and a second data structure representing dynamic objects.

3. The method as recited in claim 1, wherein the geometric analysis comprises utilizing a bounding volume hierarchy (BVH) algorithm.

4. The method as recited in claim 1, wherein the geometric analysis comprises determining one or more of: (a) a current proximity of a pair of objects represented by respective nodes or (b) a future proximity of a pair of objects represented by respective nodes.

5. The method as recited in claim 1, further comprising performing, by the one or more computing devices:

accessing a map to obtain an indication of an expected location of at least one static object of the one or more static objects, wherein the map is obtained at the first vehicle from a map source via a communication protocol.

6. The method as recited in claim 1, wherein a respective indication of at least one object of the first pair of objects is based at least in part on output produced by one or more sensors of the first vehicle, wherein a first sensor of the one or more sensors comprises one or more of: (a) a still camera, (b) a video camera, (c) a radar device, (d) a LIDAR device, (e) an infra-red device, or (f) an ultrasonic device.

7. The method as recited in claim 1, further comprising performing, by the one or more computing devices:

determining the uncertainty metric based at least in part on one or more of: (a) error bounds indicated by a sensor device used to determine the relationship, (b) an estimate of an accuracy of a type of a sensor device whose output is used to determine the relationship, or (c) an estimate of a distance, from the first vehicle, of at least one of the objects of the pair of objects.

8. The method as recited in claim 1, wherein the graph includes a second uncertainty metric assigned to a particular node, wherein the second uncertainty metric is based at least in part on an estimated probability of an incorrect identification of the object represented by the particular node.

9. The method as recited in claim 1, further comprising performing, by the one or more computing devices:

including, in the graph, a fourth node, based at least in part on input obtained from a first data source;

including, in the graph, a fifth node, based at least in part on input obtained from a second data source; and replacing, in the graph, the fourth and fifth nodes by a reconciled node corresponding to the fourth and fifth nodes, wherein the replacing is based at least in part on one or more algorithms, wherein a particular algorithm of the one or more algorithms comprises one or more of: (a) analyzing temporal data pertaining to at least one node of the fourth and fifth nodes, or (b) determining a probability that the fourth and fifth nodes refer to the same object.

10. The method as recited in claim 1, wherein the plurality of nodes comprises at least one node representing a virtual entity.

11. A system, comprising:
one or more processors; and
a memory;
wherein the memory stores program instructions that when executed on or across the one or more processors cause the one or more processors to:

obtain respective indications of (a) one or more static objects in an operation environment of at least a first vehicle and (b) one or more dynamic objects in the operation environment;

generate a graph comprising a plurality of nodes and a plurality of edges, wherein a first node of the graph represents the first vehicle, wherein a second node of the graph represents a static object of the one or more static objects, wherein a third node of the graph represents a dynamic object of the one or more dynamic objects, wherein a first edge between a first pair of nodes of the graph represents a first relationship between a pair of objects represented by the first pair of nodes, wherein at least one object of the pair of objects represented by the first pair of nodes is the first vehicle or the dynamic object, wherein the graph includes an indication of a first uncertainty metric associated with the first relationship, and wherein generating the graph comprises determining, based at least in part on a geometric analysis, that an edge between a second pair of nodes is not to be included in the graph; and cause, using the generated graph, one or more operations of a task pertaining to vehicle movements to be performed.

12. The system as recited in claim 11, wherein a first static object of the one or more static objects comprises at least a portion of one or more of: (a) a lane segment, (b) a traffic light, (c) a curb, (d) a sign, (e) a building, (f) an overpass, (g), a bridge, (g) a parking lot, (h) a landmark, (i) a cross-walk, (j) an element of vegetation, or (k) a gate.

13. The system as recited in claim 11, wherein a first dynamic object of the one or more dynamic objects comprises at least a portion of one or more of: (a) a second vehicle, (b) a pedestrian, or (c) an animal.

14. The system as recited in claim 11, wherein the memory stores further program instructions that when executed on or across the one or more processors further cause the one or more processors to:

obtain, based at least in part on an analysis of a plurality of paths between at least a particular pair of nodes of the graph, a joint estimate of an attribute value of one or more of: (a) a node of the particular pair or (b) an edge incident on a node of the particular pair.

15. The system as recited in claim 11, wherein the memory stores further program instructions that when executed on or across the one or more processors further cause the one or more processors to:

include, in the graph, a fourth node, wherein the fourth node comprises a first set of temporal data about a particular object;

include, in the graph, a fifth node, wherein the fifth node comprises a second set of temporal data about the particular object; and replace, in the graph, the fourth and fifth nodes by a reconciled node based at least in part on an analysis of the first and second sets of temporal data.

16. The system as recited in claim 11, wherein the task pertaining to vehicle movements comprises one or more of: (a) preparing a trajectory of the first vehicle, or (b) training a machine learning model.

17. One or more non-transitory computer-accessible storage media storing program instructions that when executed on or across one or more processors cause the one or more processors to:
- obtain respective indications of (a) one or more static objects in an operation environment of a first vehicle and (b) one or more dynamic objects in the operation environment;
- generate a graph comprising a plurality of nodes and a plurality of edges, wherein a first node of the graph represents the first vehicle, wherein a second node of the graph represents a static object of the one or more static objects, wherein a third node of the graph represents a dynamic object of the one or more dynamic objects, wherein a first edge between a first pair of nodes of the graph represents a first relationship between a pair of objects represented by the first pair of nodes, wherein at least one object of the pair of objects represented by the first pair of nodes is the first vehicle or the dynamic object, wherein the graph includes an indication of a first uncertainty metric associated with the first relationship, and wherein generating the graph comprises determining, based on a geometric analysis, that an edge between a second pair of nodes is not to be included in the graph; and
- cause one or more directives to implement a first trajectory of the first vehicle to be transmitted to a motion control subsystem of the vehicle, wherein the first trajectory is prepared using the generated graph.

18. The one or more non-transitory computer-accessible storage media as recited in claim 17, storing further program instructions that when executed on or across the one or more processors further cause the one or more processors to:
- obtain, based at least in part on an analysis of a plurality of paths between at least a particular pair of nodes of the graph, a joint estimate of an attribute value of one or more of: (a) a node of the particular pair or (b) an edge incident on a node of the particular pair, wherein the first trajectory is based at least in part on the joint estimate.

19. The one or more non-transitory computer-accessible storage media as recited in claim 17, storing further program instructions that when executed on or across the one or more processors further cause the one or more processors to:
- transmit a compressed sparse column representation of the graph to an element of a decision making subsystem of the vehicle at which the first trajectory is determined.

20. The one or more non-transitory computer-accessible storage media as recited in claim 17, wherein at least one node of the graph represents an origin of a coordinate frame.

* * * * *